(12) United States Patent
Salvaggio

(10) Patent No.: US 9,269,087 B2
(45) Date of Patent: Feb. 23, 2016

(54) SYSTEM AND METHOD FOR A REVOLUTIONARY DEVELOPMENT PLATFORM AND MANAGEMENT SYSTEM USING INTELLIGENT CONTROL ROOMS

(71) Applicant: Anthony Salvaggio, Allentown, PA (US)

(72) Inventor: Anthony Salvaggio, Allentown, PA (US)

(*) Notice: Subject to any disclaimer, the term of this patent is extended or adjusted under 35 U.S.C. 154(b) by 157 days.

(21) Appl. No.: 14/016,270

(22) Filed: Sep. 3, 2013

(65) Prior Publication Data
US 2015/0066815 A1  Mar. 5, 2015

(51) Int. Cl.
| | | |
|---|---|---|
| G06F 17/00 | (2006.01) | |
| G06F 17/20 | (2006.01) | |
| G06Q 30/00 | (2012.01) | |
| G06Q 10/04 | (2012.01) | |
| G06Q 10/06 | (2012.01) | |
| G06Q 50/16 | (2012.01) | |

(52) U.S. Cl.
CPC .............. *G06Q 30/00* (2013.01); *G06Q 10/04* (2013.01); *G06Q 10/06* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 8,204,610 | B2* | 6/2012 | Lee et al. .................. | 700/17 |
| 2015/0066548 | A1* | 3/2015 | Salvaggio .................. | 705/7.11 |
| 2015/0066815 | A1* | 3/2015 | Salvaggio .................. | 706/11 |

OTHER PUBLICATIONS

Intelligent graphic interface design: designing an interactive control room user interface, Begg, I.M.; Darvill, D.J.; Brace, J. Systems, Man and Cybernetics, 1995. Intelligent Systems for the 21st Century., IEEE International Conference on Year: 1995, vol. 4 pp. 3128-3132 vol. 4, DOI: 10.1109/ICSMC.1995.538263.*
A Generic Connection Admission Control in ATM Networks, Zaied, H.A. Laser and Fiber-Optical Networks Modeling, 8-th International Conference on Year: 2006 pp. 29-31, DOI: 10.1109/LFNM.2006.251967.*
Kinematic Design Optimization of an Actuated Carrier for the DLR Multi-Arm Surgical System, Konietschke, R.; Ortmaier, T.; Hagn, U.; Hirzinger, G.; Frumento, S. Intelligent Robots and Systems, 2006 IEEE/RSJ International Conference on Year: 2006 pp. 4381-4387, DOI: 10.1109/IROS.2006.282014.*
Realization of a comfortable space based on Kansei engineering, Takagi, M.; Watada, J.; Yubazaki, N. Systems, Man and Cybernetics, 2004 IEEE International Conference on Year: 2004, vol. 7 pp. 6463-6464 vol. 7, DOI: 10.1109/ICSMC.2004.1401417.*

* cited by examiner

*Primary Examiner* — Michael B Holmes

(57) ABSTRACT

A system and method for a revolutionary development platform and management system using intelligent control rooms, hereafter referred to "the system", that implements a generic intelligent control room concept in any information system using a groundbreaking framework for the design, build, control and operation of an enterprise's management data and human reporting. It provides both operational knowledge and quality assurance by pragmatically defining the gathering and flow of information in one or all organization units and allows for seamless knowledge dissemination into and within the organization. To meet the mantra of no programming required all new object domains and expert subject rules are added via the base code and database design functionality without requiring any additional programming.

2 Claims, 31 Drawing Sheets

SYSTEM AND METHOD FOR A REVOLUTIONARY DEVELOPMENT PLATFORM AND MANAGEMENT SYSTEM USING INTELLIGENT CONTROL ROOMS

FIELD OF THE INVENTION

A system and method for a revolutionary development platform and management system using intelligent control rooms, hereafter referred to "the system", represents a foundational change in management software. The system uses a groundbreaking framework for the design, build, control and operation of an enterprise's management data and human reporting. It provides both operational knowledge and quality assurance. It has two primary purposes:

1. programmatically define the gathering and flow of information in one or all organization units, known as cells
2. allow for seamless knowledge dissemination into and within the organization.

DESCRIPTION OF RELATED ART

Searches for intelligent control room and software development platform return zero results in the United States Patent and Trade Office databases. This testifies to the revolutionary nature of this systems concept. Searches for the much broader topic of intelligent control room software yield only seven results. The U.S. Pat. No. 7,786,371 entitled Modular system for MIDI data which is one of the returned results deals only with "Rack mountable, user-programmable electronic modules."

Public domain searches also reveal that this concept is both new and revolutionary. Internet searches using Google return references like Intelligent Control Room Management for Oil and Gas at http://www.ge-ip.com/products/intelligent-control-room-management-for-oil-and-gas/p3583. These merely seek to implement specific idiosyncratically designed implementations of regulations and standards such as in this solution which states that it addresses, "all aspects of RIN 2137-AE28 Pipeline Safety: Control Room Management/Human Factors Regulations."

Other references such as the NetBeans Platform Showcase show software development objects in a library that have no relationship to generic control room functions and customization of those functions without programming.

SUMMARY OF THE INVENTION

The system achieves its revolutionary flexibility and extensibility of functionality through individual "intelligent control rooms" that are easily designed and built into a comprehensive network of composite business intelligence and human reporting. As an integrated repository of human knowledge within the enterprise, the system is a bold new approach to effective management. It drives knowledge across the enterprise and retools management to reside closer to the operational process. The system provides tremendous opportunity for, transparency in our mobile, social and highly integrated world.

Enterprise Success Factors and Goals

Leveraging human capital, best practices, quality assurance (QA) and Six Sigma techniques are critical success factors in any enterprise. Your management control system (MCS) is the way you implement these. Your MCS must be as simple to implement and set up as a spreadsheet or checklist in order to be used and be effective. The goals of an MCS are:

Insure information flow through the organization to enable visibility and governance Promote true insight by including human feedback, judgment, perspective Spread knowledge and best practices and validate their degree of execution Provide properly distilled key information to all levels of management Allow upper management to advise and consult with lower and peer management Deliver risk assessment and governance facts and warnings Assure a common language of facts and rules for governance of the company Drive a fact-based culture and reduce anecdotal and storytelling management practices Build a historical repository of operational data and facts, and a consistent audit trail A New Model Most enterprises are made up of collections of management units. Usually, this is a department, work group, or other similar organization unit. These operating cells have their own rules of engagement that focus on how work is accomplished. The information that the cell uses to manage itself contains both hard data, such as key performance indicators (KPIs) along with other numerical data; and soft data, such as opinions, perspectives, and similar human knowledge about the enterprise and the work at hand. Soft data sometimes comprises "Everyone knows . . . " knowledge items, and sometimes status information and opinion conveyed verbally or in writing.

The system is the most advanced concept in MCSs. It is an easy-to-modify construct that accepts rules, procedures, data, and information from the enterprise. It uses a conceptual control unit that manages this flow of hard and soft information. The system readily automates and institutionalizes both the objective (empirical) and subjective (human) knowledge needed to optimally manage the enterprise. The integration of business rules, checklists, advice, etc., is married with the operational flow of data. This interrelation of hard and soft data provides the most accurate, qualified and meaningful information.

The System's Intelligent Control Room Concept is the Standard for the Future

What is an intelligent control room? To begin with let's look at what drives the need for an intelligent control room. A great management system must identify, gather and use knowledge across the enterprise. It must do this as automatously and automatically as possible to ensure workforce optimization. This knowledge occurs in the form of books, best practices, rules of engagement, checklists, etc. There are endless elements of knowledge that must constantly be moved into the elemental working cells of an enterprise. Then it must be confirmed that it is being leveraged to its fullest. Management systems of the future need to be cognizant of both this flow of information through the enterprise and through the management system itself. They must widen this knowledge, spreading and pushing it throughout the enterprise. Leveraging knowledge has consistently proven to have a significant return on investment (ROI) for any organization and now more than ever is absolutely necessary for future survival.

To accomplish this, a necessary operational component for a management system is the use of an intelligent control room. An intelligent control room sits above the source data, constantly monitoring readings from all systems. It has access to all the information. It has knowledge and algorithms about why criteria are too high or too low or varies too much according to readings and algorithms. Its first job is to be a "canary in the mine" to provide warnings of danger based on sensory perception. An intelligent control room, however, is much more sophisticated than a canary. It's not just a reactionary warning to current or pending conditions.

The continual increase of knowledge coupled with having the right intelligence embedded within the system; makes intelligent control rooms more sophisticated over time. The system's intelligent control room is aware of past performance as it measures current operating conditions and potential danger to the business. This historical perspective allows the system to predict future trends. As intelligent control rooms become more intelligent, their ability to predict outcomes increases. Accurately predicting outcomes of operations, processes, projects, etc. is a nirvana like goal for any enterprise. The system is the first software to introduce the concept of similarly intelligent controls rooms that promote enhanced workforce efficiency and effectiveness with greater product and service quality assurance. The system is the future of management systems.

Imagine an instantly configurable pipeline for information that was capable of flowing to any of the management cells of an enterprise. The system takes this concept one step further by applying the concept of a "best manager" or "best consultant" function as a control unit on this pipeline. This expert consultant constantly:
examines the flow of data through it
sets up dials and dashboards for warnings and analytics
creates an enhanced electronic repository of information Intelligent Control Rooms thus provide a unique opportunity to apply internal and external knowledge to operational activities. They blend historical data with current knowledge and predict future courses of action. The system enhances the sharing of information and provides agility in intelligent control rooms that allow rules and reasoning procedures to be adapted as needs dictate. An individual manager can establish new perceptive qualifiers at any time, expanding or transcending the current paradigm of monitoring and control. This is the future of management systems where the frame of management capabilities is greatly enlarged allowing for the total transparency of the operational environment.

The Ease and Simplicity of Developing in the System's Platform

The system's intelligent control room is a "bottom up" model, where every single entity uses an intelligent control room—and shares its information across the organization. The system's intelligent control rooms are easy to implement, just like plugging an air filter or carbon monoxide detector into every room in your house.

The system's intelligent control rooms and knowledge flow are not implemented in a "traditional" computer system fashion. Historically, decades have been spent doing analysis and architecting management information systems. This was followed by years writing, programming and testing them. After a certain level of success was accomplished, these remained frozen at heart information systems making changes difficult and time-consuming. They stifled the flexibility needed to remain competitive.

Managers need an implementation method that is as easy to use as a spreadsheet and allows a manager to build an intelligent control room quickly. The system enables managers to quickly define the data, the rules, and what these mean to a specific organization unit. The manager can easily modify dashboards, events, rules, etc. with the same simplicity of modifying a spreadsheet. This enables intelligent control rooms to be built without the need of a computer engineer. The manager understands what their business needs are. The manager understands the data. They are the one who needs to be able to define it and use it to manage the cell.

Imagine that you can build an intelligent control room to monitor your organization unit whatever its size. Every manager in the organization can set up one for their unit. Each intelligent control room is like a LEGO piece. You simply snap them together into a coherent, integrated system. The assembled structure is able to leverage the collective awareness of ALL intelligent control rooms. An intelligent control room at any location in the structure is instantly aware of potential problems anywhere else in the enterprise. This is true ubiquity of information.

Collections of Intelligent Control Rooms

The system's ability to combine intelligent control rooms into higher-order, more complex management groupings is at the heart of its value proposition. This inherent strength of the system's model and its ability to network all cells in the enterprise, allows the system to keep pace as an organization changes. These changes can occur in the form of mergers and acquisitions, or by extending the model to incorporate entities previously excluded from the system. They can also occur when a management cell splits into smaller ones.

The system allows for an infinite number of control rooms. With increased complexity, the guidance available is much more than the sum of its parts. The system allows managers to leverage the human insight of the "A" players so that others can function on their same level. When we add formal and informal systemized knowledge relevant to the operation of the management cell, we can achieve better outcomes with fewer resources. We do so by:
Deploying an agile management information flow
Integrating hard and soft data
Eliminating human data filters of bad news—or exaggerated good news
Specifying formal checkpoints and quality assurance (QA) of information and information processing
Ensuring formal records of information exist within a permanent repository
Providing the ability for true management review and governance without the time-consuming efforts of needing to form a management picture of the past
Making all this easy to modify by formalizing the cell model in an intelligent control room environment The system creates an infinitely open architecture that "automates" human knowledge across an enterprise. The system, in effect, automates knowledge across the known universe, while simultaneously anticipating the unknown.

Building Solutions in the System's Platform

The system is a revolutionary development platform for quickly building powerful enterprise information systems. With the system you can build powerful enterprise solutions with no programming required. The system has a powerful, yet easy-to-use development framework for building world-class global management information solutions. Unlike other systems, the system requires no programming and solutions can be implemented within 30 days. Just as spreadsheets can be used to develop highly customized applications without coding, the system allows you to build enterprise-wide, multi-user systems quickly and cost effectively.

The system is a flexible platform for rapid development. It leverages five core systems to build highly customized solutions:
a data collection system
an expert knowledge system
an analysis engine a report engine & dashboard tool set
a performance repository You can also get up and running immediately with complete, "out-of-the-box" solutions or author your own custom applications within weeks without costly development.

The system lets you create solutions that enhance visibility, control and governance. The system framework enables applications that enforce best practices, identify risks, and drive team communication. The system's solutions allow organizations to leverage their knowledge and experience across teams. Creating a solution in the system, whether simple or advanced, requires five primary steps:

1. Define the operational data and human feedback you want to capture
2. Identify the checklists, best practices, rules, and boundaries your organization wants to enforce
3. Determine the key performance indicators you want to measure and manage
4. Design the report layout you would like and dashboards you need to maximize visibility
5. Define the metrics to be stored in your performance repository With the system you gain valuable insight by capturing stakeholder feedback, whether inside or outside your organization. You schedule role-specific questionnaires that make sure you ask the right questions of the right people. The system uses reflexive questions to make sure the right questions get asked promoting virtualized "management by walking around". The system also leverages built-in dashboards to analyze results and enables you to be up and running within days.

Unlike other tools, the system allows for seamless integration between your hard data and real-time human feedback to provide unparalleled visibility. With the system you can:
Capture your operational hard data and 360-degree team feedback in one location
Pour your combined data through a filter of best practices, experience, and rules
Perform drill-down analysis through a rich, interactive dashboard
Customized reporting with the tools of your choice
Build a repository of performance data for benchmarking and comparison
Dramatically enhance visibility, control, and governance The system is rapid deployment at low cost. With the system you can quickly deploy world-class solutions. The system was developed from the ground-up as a low-cost, easy-to-implement solution. Whether you're building your own customized application or leveraging an out-of-the-box solution, you can be up and running within a few weeks. The system is offered as a Software as a Service (SaaS) solution. Hosted on secure servers, all you need to use the system is a web browser and internet connection. There is:
No hardware or software to install
No ongoing maintenance
Low administrative overhead The system facilitates easy development without programming by providing five core components that solution authors can easily leverage. Each component can be quickly customized to meet the unique needs of your organization.

The System Components

An Automated Project Office (APO) is at the heart of the system's management system. An APO is a powerful platform that allows for rapid development of industry-specific project office applications. Much like a spreadsheet is a blank slate on which you can build highly customized solutions, an APO allows organizations to build these solutions quickly and cost effectively. It is a revolutionary way to manage IT projects. An APO provides every one of your IT projects with world-class, phase-by-phase quality assurance reviews. Containing industry best practices, expert knowledge, and standard processes, an APO brings control, governance, and visibility to your IT organization. An APO:
Cut costs by identifying off-track project activities early
Improves efficiency and learning through consistent enforcement of IT best practices
Eliminates surprises through enhanced team communication
Increases visibility and management of project risk A central component of the system is the Intelligent Control Room. The System's Intelligent Control Room is a powerful analysis and scheduling platform that filters operational data and human feedback through a proprietary knowledge system that constantly searches for compliance, risks, etc., preparing a constant flow of evaluative data for analysis and presentation. The System's Intelligent Control Room gives you:
Automated analysis and diagnostics based on key performance indicators
Consistent quality assurance reviews
Regularly scheduled input from all stakeholders, along with data feeds from operation systems
Early risk analysis leading to reduced failure, delays, costs, and improved customer satisfaction
Built-in issue tracking system
Risk assessment and scoring engine
Quality assurance review scheduling
QA compliance management
KPI scoring and reporting The Operational Information Integration System (OIIS) accumulates quantitative data and 360-degree team feedback to assemble and present a constant stream of operational data to the System's Intelligent Control Room. Working with the System's Knowledge System, it selectively gathers only the pertinent data required for the review process. The OIIS provides the following:
A complete, holistic view of your operations' health and status
Further leverage of data you already collect, such as time, cost, and resource data
An understanding of the human dimensions of your operations by capturing subjective feedback that often gets missed by traditional tools
Minimizes time, energy, and cost to collect and process QA data
Ability to import data from your existing systems
Gathers feedback from the right people at the right time
Role specific knowledge and interaction
Requires little human effort (automated)

The Expert Knowledge System (EKS) is a customizable library of expert knowledge, industry best practices, key performance indicators, rules and standards that can be consistently leveraged across your organization. The EKS provides:
Systematic application of best practices, standard processes, etc.
World-wide expertise applied regularly and systematically
A true "expert system" extension for QA analysis
Easily extendable to include additional organization-specific knowledge & rules
Industry standard processes and best practices . . . built in!
Support for multiple methodologies and easily extended into new target areas The Analysis and Presentation System (APS) has rich dashboards, powerful reporting capabilities and comprehensive analysis that give insight into your organization's data. It provides:

Quick and easy identification of anomalies and potential risks
Easy drill down capability to perform discovery and root cause analysis
Alerts and exceptions that give you early insight into off-track activity and risks
A clear view of "operational reality vs. desired or best practices"
A comprehensive "hub" for visibility, control, and improvement
Continuous team feedback accelerates the learning of the organization
Robust, interactive dashboards that provide at-a-glance access to your most important data
The ability to create and share custom report using the tools of your choice
Exceptions alerting and reporting The System's Comprehensive Data Repository System (CDRS) is the first-ever repository of all historical data, findings and analysis that reflects all ongoing and past review cycles. It provides:

Archived data that allows you to view performance trends over time
Benchmarking comparisons of present performance to past metrics
Composite risk profiles
A full BI repository
A comprehensive diary for all reviews, phases, etc.
An easy input to extensive benchmarking and operational research The system gives you expert solutions fully developed in a matter of days. The system is a very flexible development platform that can be used in developing solutions in any industry. Fully developed solutions are already designed for the IT and supply chain domains. With expert analysis, best practices, and assessments built-in, you can be up and running in a matter of days.

DETAILED DESCRIPTION OF THE PREFERRED EMBODIMENT

System Architecture
Data Flow

The system allows for a unique flow of data. See FIG. 1. Valuable data, lost to other applications can flow continuously into the system from both operational application sources and human feedback. Unlike other tools, the system allows for seamless integration between this hard data and human feedback in real-time. This provides unparalleled visibility into the enterprise. The system brings to light all aspects of the organization's operations both the positive aspects and the ones requiring improvement. The system can tell you what is working, what is not working; why these are occurring and what should and is being done about it. Furthermore the system filters, analyzes and organizes this data through layers of all the best thinking and practices. The system uniquely combines knowledge and experience, quality checklists and best practices and comprehensive team communications into a successful formula ensuring visibility, control and governance. The system captures all this data with a single, easy to use interface. The system then makes all this data available through interactive dashboards with complete drill-down and analysis capabilities in a secure fashion to all qualified personnel. You can also customize reports with the tools of your choice. Furthermore, the system builds a repository of your data for benchmarking, comparison and historical analysis.

Tiers

The system follows a sophisticated strategy for software as a service (SAAS) by utilizing a well-defined 4 tier architecture governing its design, deployment and operation. See FIG. 2. A multi-tiered SAAS architecture is a generally accepted standard for modern application design and deployment.

The system's architectural tiers rest on a foundation of one of the most extensible data structures every defined that allows new entities to be defined for customers on the fly. New domains of data can be added as an organization's understanding evolves or the enterprise adapts itself to new customer demands and a changing operational environment. The system's advanced data envisioning concept allows entities and relationships to be defined for a customer's unique needs without additional relational data definition language specification or application programming code development. This enables the domain of the system to be whatever the customer needs it to be. This makes the system a distinctively flexible solution platform. The system uses the power of Microsoft's SQL Server relational database management system (RDBMS) to provide the best possible power, performance and reliability of data.

On top of this tier resides the system application code base. The system code is generically structured so that there is little or no need to create additional application code to support a customer's individual needs. The code is divided into two major categories. First is the system base code that contains all the system level functionality of the system. The primary functions of maintaining data for necessary elements like people, organizations, roles, etc. are also located here. Additional code elements power the functionality for defining new data elements and associated functionality. The second category of code deals with specific data, navigation and built in behavior for a specific solution built on the system's platform.

Above this sits the knowledge cartridge. This is where all the content authored by experts resides. This tier is the engine of instructions for the system. It is the workflow, the rules, the equations and calculations for analysis, the alerts, the key point indicators (KPIs), questions and dashboards defined by the acknowledged professionals that drive the system's data flow and actions. Separating out this tier offers a world-class development platform to experts so that best-of-breed solutions can be created without additional and time-consuming programming. Powerful solutions are easily developed in market verticals.

Finally above all is the system's client configuration tier which holds four categories: the customer's own configuration, the system's built in configuration, the user's preferences and client extended data definitions. This interface represents a novel approach to user ergonomics. It is a world-class design through which clients' specific designs can be created without additional coding. Individual user preferences are tracked to promote ease of use and efficiency and clients can administer their own system with simple and natural interactions.

Intelligent Control Room Structure

The Intelligent Control Room is at the heart of the system's revolutionary concept of intelligent governance. See FIG. 3. The intelligent control room acts like a person capturing data just as a manager would and directing actions like an expert. The intelligent control room is the beating heart or engine layer of the system. It lies at the center of the data layer and the services layer. The intelligent control room rules, alerts, content, workflow, analysis, dashboards and reporting are all created through a common application layer that provides administration functions and component specific graphical user interfaces.

Intelligent control rooms are smart entities. As knowledge increases over time and history is remembered, intelligent control rooms gain sophistication. This enables the system to predict future trends with ever increasing accuracy. The system can implement similarly intelligent controls rooms. These promote enhanced workforce efficiency and effectiveness by ensuring greater product and service quality assurance. These intelligent control rooms are capable of flowing this information to any of the management cells of an enterprise. As a part of the expert knowledge, the concept of the "best manager" or "best consultant" is applied to this information in capturing the data, analyzing and reporting it and directing employee activity.

The system's ability to combine intelligent control rooms into higher-order, more complex management groupings is a powerful aspect of continuous improvement through layered intelligence. This inherent strength of the system's model and its ability to network all cells in the enterprise, allows the system to keep pace as an organization changes. These changes can occur in the form of mergers and acquisitions, or by extending the model to incorporate entities previously excluded from the system or they can occur when a management cell splits into smaller ones. The system also allows for an infinite number of these intelligent control rooms or layers.

The intelligent control room is a critical function for sophisticated governance. Intelligent control rooms enable applications to become more intelligent and interact with humans in a more natural way at a higher level. They also add substantial further benefit in that they handle mundane human behavior automatically by predetermined behavioral rules. The way this concept is applied is unique to the system. It is a more sophisticated layer with its own intelligence and logic on top of other transactional systems. This powerful construct allows humans to see a broader view of the total system's operation and controlling elements that effect strategic operations.

Features

The system's feature set is incredibly rich in its function set and deep in its utility. It allows everything from $3^{rd}$ party application programming interface (API)s and benchmarking capability serviced through the data layer, to common administration functions serviced through the application layer that support additional built in components, and other $3^{rd}$ party applications to integrate seamlessly with the system.

FIG. 4 outlines these features found in each layer. The engine layer contains the feature elements like controls, rules and alerts that bring the strength of your best experts to each and every activity in the enterprise that the information system encompasses. By discretely separating out each of the features into a separate component, the system makes them easy to create, maintain and execute. This level of object-orientation also promotes the growth and sophistication of these elements over time and in response to decisions made and actions taken concerning the criteria that they govern.

Implementing Solutions

Creating a solution in the system, whether simple or advanced, prepackaged or consulting requires only five primary steps:
1. Define the operational data and human feedback you want to capture.
2. Identify the checklists, best practices, rules, and boundaries your organization wants to enforce.
3. Determine the key performance indicators you want to measure and manage.
4. Design the report layout you would like and dashboards you need to maximize visibility.
5. Define the metrics to be stored in your performance repository.

FIG. 5 outlines these roles and actions. For elementary solutions you gain valuable insight by capturing stakeholder feedback, whether inside or outside your organization. Scheduled role-specific questionnaires make sure you ask the right questions of the right people. The use of these questionnaires enables you to:
Ask reflexive questions make sure the right questions get asked
Maximize your workforce efficiency by virtualizing "the management by walking around principle"
Quickly leverage knowledge via built-in dashboards that analyze results The system makes this implementation both simple and direct. All you have to do is:
1. Create survey questions, along with answers and scores.
2. Identify roles to be surveyed.
3. Add individuals, with email addresses, to the system.
4. Schedule questionnaires and analyze results using built-in dashboards and reports.

A customized solution in the system has only a few extra steps. In addition to collecting stakeholder feedback through targeted questionnaires you can, for example, pull in data from your existing systems for correlation and analysis. From this you can:
Create a single repository of operational and human data
Use built-in dashboards for enhanced visibility and reporting
To implement a customized solution in all you have to do is:
1. Define survey questions, answers, and desired respondents.
2. Create fields within the system for external system data.
3. Extract external system data to .csv files, which are then mapped to the system fields.
4. Create any desired custom dashboard elements or reports.

A growing number of packaged, industry-specific applications are available for the system. These solutions come bundled with defined data collection and analysis, questions, answers, metrics, and placeholders for external data. Ready for immediate implementation, packaged solutions allow organizations to throw out the development cycle and be up and running within days.
Leverage industry-specific expert knowledge overnight
No lengthy implementation process. Be up and running in days.

For example to implement an APO all you need do is:
1. Review built-in questions.
2. Identify projects, people, and roles that need to be created.
3. Optionally prepare .csv files to import data from external systems.

The system is designed to leverage a partner channels and crowd sourcing to develop "core" solutions that are deployed with most of the data collection and analysis predefined. Implementation involves defining remaining, organization-specific data elements required, along with dashboards and reports to accommodate customer reporting requirements.
Leverage industry expertise with extensions to meet your organization's specific needs
Cost effective way to develop powerful custom solutions
To implement a packaged solution in the system you simply:
1. Map data from your systems to the system (via .csv files).
2. Create unique questionnaires.

3. Define required analysis.
4. Develop/review custom reports and dashboards.
5. Identify people/roles to be surveyed.

Using the system as a platform, it is possible to develop the ultimate, complete, highly customized executive information system to meet the unique needs of a particular organization. This system:
Incorporate your organization's processes, analysis, and reporting needs
Leverages the system's core systems to dramatically reduce implementation time and cost
Creates a repository of your organization's data and operational performance To implement this level of system is naturally a greater effort. Still the system simplifies this work, reducing it to easily understood steps which include:
1. Identifying data from other systems to be imported into the system.
2. Creating and installing middleware to automatically push data from external sources to the system.
3. Developing questionnaires.
4. Defining the people and roles within the system.
5. Creating custom dashboards and reports.

Data Models

FIG. 6 shows the database model necessary to implement the cartridge deployment features. Cartridges allow various technically specific verticals to be easily developed and implemented using the base code platform without additional programming. The concept of a cartridge appears simple yet has profound implications that are subtly felt throughout the development platform aspects of the system. Cartridge deployment deals with those aspects of the system that are necessary to promote the developed cartridge throughout the system.

The Cartridge Structure Database Model

FIG. 7 shows the database model for the actual cartridge structure. This is where the substance of the cartridge is created by a subject matter expert that is using the system's development platform aspects to create an industry specific application. This allows the system's intelligence and capabilities to grow far beyond its original base operating parameters through the collective intelligence of worldwide recognized industry experts. This model also sets the groundwork for associating any new entity that has been added to the system to support a cartridge along with all the accompanying attributes or fields.

The Entity Data Questionnaire Database Model

FIG. 8 Shows the entity data questionaire database model which ties knowledge cartridges to questionaires that support their operation. Questionaires can support multiple cartridges through versioning and are part of the generic extensibility built into the system's development platform philosophy.

The Entity Relationship Database Model

FIG. 9 shows the entity relationship database model. This model is responsible for beginning the extension of the underlying relational database management systems original logical model to include new domains of information previously unknown during the original system configuration. Through this concept's facilities, subject matter experts or any authorized user with specific needs to track data on objects that were not a part of the original system's implementation can define the objects and relationships needed to add them creating their own unique implementation. The entity relationship model deals with defining and tying together all the relationships between the objects necessary to implement this functionality.

The Entity Database Model

FIG. 10 shows the entity database model. This model implements the underlying constructs for the objects to be added to the system to support the extensibility of the development platform's functional enhancement without programming concept. In this model, the actual entities for the new objects are defined along with their attributes and associated with key point indicators that are the heart of the intelligent control room's monitoring activities.

The Field Catalog Database Model

FIG. 11 shows the field catalog database model. In this model a catalog of fields are associated to the cartridge and versioned throughout the field, catalog and cartridge relationships.

The Import Specification Database Model

FIG. 12 shows the database model that supports the loading of imported data into the system from other sources like preexisting systems of record. This model enables a specification to be defined along with a job schedule so that this process can be automated and happen on a regularly occurring basis.

The Issues Database Model

FIG. 13 shows the database model that defines the entities necessary to support the issues function in the system. The system uses the integrated issues function to track problems and alert users to events that are at variance with optimal system parameters. Since issues can be long running, have similarities and spawn other issues or consequences, the issues system contains a history feature that allows complete auditing and comparative analysis.

The Organization Database Model

FIG. 14 shows the organization database model. This model allows authorized users to define any organizational structure in the system, modify and maintain it, and delete any old or unused structures. Being able to implement an organization structure provides a visual vehicle for users to understand questionnaire flow. The organization structure also provides the ability to stage changes to the structure and see the impact of those changes.

The Person Database Model

FIG. 15 shows the person database model. This is a simple, yet powerful construct that enables people/users to be defined to the system in the context of their accessibility and roles that they will fulfill in system activities.

The Questionnaire Response Database Model

FIG. 16 shows the questionnaire response database model. This model defines questionnaire responses and associated question sets that are both versioned. It also is the repository for questions that are version specific. Lastly it allows for the storage of any attachments that users wish to add to their responses when filling out a questionnaire.

The Questions Catalog Database Model

FIG. 17 shows the questions catalog database model. This model ties knowledge cartridges together with individual content and questions and questions catalogs. It also holds answers to the questions and fully supports versions.

The Questionnaire Schedule Log Item Database Model

FIG. 18 shows the questionnaire schedule log item database model. This model defines a log for the questionnaire and associates a scheduling rule with the log so questionnaires can be sent out periodically on a controlled and mathematically defined basis.

The Questionnaire Scheduling Rule Database Model

FIG. 19 shows the questionnaire scheduling rule database model. This model holds the details for the questionnaire scheduling rules and questionnaire scheduling rule trigger as well as its period of reoccurrence.

The Questionnaire Database Model

FIG. 20 shows the questionnaire database model. This model associates all the detailed aspects of questions with knowledge cartridges, questionnaires, and question sets. It also implements versioning for all these elements.

The Security Database Model

FIG. 21 shows the security database model. This model implements the details of profiles, permissions and resource groupings necessary to maintain operational security for the system.

The Define Notification Database Model

FIG. 22 shows the define notification database model. This model implements the notifications that are driven by specific questionnaire parameters. These notifications are the basis for prompting the user to interact with the system to fulfill the basic needs for soft data gathering.

The Technology Architecture

Overview

The technology architectures provide a logical description of the infrastructure and system components that is necessary to support the system. While there can be many perspectives of the enterprise architecture, the following specific architectural perspectives are addressed here:

The Application Architecture—is the architecture of any automated services that supports and implements functional requirements, including the interfaces to the business and other applications. It describes the structure of an application and how that structure implements the functional requirements of the organization.

The Operational Requirements—Define the reliability, manageability, performance, security, and interoperability requirements of the software (to list just a few).

The Technical Architecture—The architecture of the hardware and software infrastructure that supports the organization and implements the operational (or non-functional) requirements, particularly the application and information architectures of the organization. It describes the structure and inter-relationships of the technologies used, and how those technologies support the operational requirements of the organization.

The system utilizes a service-oriented approach. Service-oriented architectures (SOA) employ an architectural concept that defines the use of services to support business requirements. In a service-oriented architecture, clients consume services, rather than invoking discreet method calls directly. An SOA aims to solve the problem of distributed application development. A service can be described as an application that exposes a message-based (asynchronous) interface, encapsulates its data, and manages ACID (Atomic, Consistent, Isolated, Durable) transactions within its data sources.

Generally, SOA is defined as a set of service providers that expose their functionality through public interfaces. The interfaces exposed by the service providers can then be individually consumed or aggregated into composite service providers. The SOA is implemented in the system as SOAP based web services. SOA is rooted in object-orientation but adds a layer of abstraction. It is not a departure from object-orientation, but rather an evolution.

In a service-oriented model, we introduce a further "layer of indirection". This alleviates some of the pain associated with traversing complex object models. The services layer, denoted in the diagram below by the cloud, provides black-box functionality. See FIG. 23.

The system employs Web services as a vehicle for the implementation of services in general. Web services applications are built upon platform-independent protocols—SOAP, WSDL, UDDI, and HTTP. Because of the abstraction the service layer provides, the presentation layer supports the following:

Smart applications with rich user experiences—solutions that interact with one or many services, intelligently cache the information they retrieve, and deliver both great interactivity and support for offline information processing.

Smart devices—solutions from self-service kiosks to inventory tracking on handhelds to contact management on smart phones.

Web user interface (UI)—enterprise portal solutions that unify and coordinate business-employee and group-group interactions.

Automation systems—clients that present no UI unless they need to raise an exception.

Process orchestration services—services that invoke other services to offer aggregated capabilities.

Any applications that can send and\or receive messages over HTTP(S).

The presentation layer is free to concentrate on what it does best, the presentation.

To clarify, SOA is a design principle whose goal is to achieve loose coupling among interacting software agents, whereas web services are an implementation technology.

Logical Tiers

A good architecture emphasizes a separation of responsibilities. This is achieved by dividing the application into layers where each layer should only communicate with the layer(s) contiguous to it. By designing different tiers, it is possible to reconfigure the application to meet a number of architectural or configuration demands.

Separating the application into layers also isolates each major area of functionality. The presentation is independent of the business logic, which is separate from the data.

The system is constructed in the following logical layers:
Web Application Layer (ASP.NET)
Controller Layer (C#)
Web Service Layer (Business Process Façade—No Business Logic—C#)
Business Service Layer (Business Rules—C#)
Data Access Layer (Data Access—C#)

See FIG. 24.

Please note, the Web Application is considered part of the User

Interface logic. It is a client of the main server environment even though the logic runs on a server behind the firewall. The Web application (along with other clients) accesses the business and data functionality through a service (façade) layer.

Configuring the system in this way has the advantage of allowing all user interface elements (whether it's the web application or rich clients), to come into the system through the same standardized interface. See FIG. 25.

FIG. 26 illustrates some of the basic responsibilities of each layer.

The following sections will drill down deeper into the design of the architecture, focusing on each layer's responsibilities.

WEB Application Layer (WAL)

The Web Application architecture is structured around the MVC (Model View Controller) design pattern. MVC is a fundamental design pattern for the separation of user interface logic from business logic. The MVC pattern separates the modeling of the domain, the presentation, and the actions based on user input into three separate classes:

Model—This object knows all about the data to be displayed and is responsible for managing the data and the actions of the application. It can be thought of as the processing part of an input-process-output system.

View—This object manages the information displayed to users. Multiple views can be used to display the same information in different ways. It can be thought of as the output part of an input-process-output system.

Controller—This object allows the user to interact with the application. It takes input from the user and passes instructions to the model. In the input-process-output system, this is the input part.

Responsibilities

Separate the control flow (navigation) from the pages, forms, and controls that the user interacts with.

Abstract state management for a use case from the forms and controls working on that data.

Use the same programming model for the code that manages control flow and state for different types of applications, including Windows-based applications, Web applications, and device applications.

Program the user interface using a known proven industry pattern (MVC)

Guidelines

Developers create new views (or ASP.NET pages) that inherit from a parent view called a Master Page. Each new controller may handle the interaction with the Web Services Layer for one or more views.

WEB Service Layer (WSL)

In line with the SOA paradigm, the Web Service layer implements a Façade Pattern to hide the complexities of dealing with the business service layer. The Façade Pattern presents a simple way into the system for client applications. By having a separate façade layer, we make sure the business services logic is organized so that it can perform its duties more effectively. FIG. 27 illustrates this point.

The current industry work on standards around UDDI, WSDL, Web Services, etc. promises that more and more applications can be constructed from constituent services rather than re-invented domain-specific code.

Responsibilities

Isolate Clients from Business Tier
Simplifies Client Programming
Input Validation
Authentication and Authorization (see Security)
Boundary Transformations between Tiers
Transaction Control (see Transaction Handling)

Guidelines

It is important to note that although the Facade simplifies the use of the required subsystem it only deals with a subset of the original system. Therefore, certain functionality may be unavailable to the client through a façade. In these cases, extra functionality would be provided by either extending an existing façade class or creating a new one.

Business Services Layer (BSL)

Whereas services typically expose only coarse processes, the business service layer encapsulates atomic business operations that can be orchestrated by the façade, or by other business units. Business logic generally includes any logic associated with providing some service. Business logic includes all logic related to workflow, business processing, and business rules. Each Business Logic Component deals with a specific type of business entity. Extracting the business rules into their own classes encapsulates business rules allowing developers direct access to those rules.

Responsibilities
Makes calls through Data Access Layer
Business Flow
Business Rules
Business Rule Validation
Data Transformations
Data Access Delegation Guidelines The goal is to create business routines with internal integrity (strong cohesion) and small, direct, visible, and flexible relations to other routines (loose coupling).

Business Orchestration

On occasion one business layer will need to know about another business layer. Creating cross references between business layers can be tricky. At some point you may end up with a circular reference, and this is where orchestration layers come in to play. Orchestration layers provide the ability for two subsystems to know about it, but not each other. FIG. 28 shows two autonomous assemblies coming together to fulfill a business need via an orchestration assembly.

Data Access Layer (DAL)

The complete encapsulation of data access is an important tenet of the system. This is the main purposes of the Data Access Layer (DAL). The Data Access Layer components provide methods to perform the following tasks upon a database, on behalf of the caller:

Create records in the database

Read records in the database, and return business entity data to the caller.

Update records in the database, by using revised business entity data supplied by the caller Delete records in the database
Provides Data Source Abstraction
Data Validation
Optimizes Data Access Typically, each Data Access Logic Component encapsulates the data-related operations for a single table or a group of related tables in the database. For example, we have defined one Data Access Logic Component to deal with the Project and Project related tables in a database, and another Data Access Logic Component to deal with the Questionnaire tables. Whenever a Project Information is required by a business routine, the system must retrieve the Project data through Project Data Access Component.

This approach not only supports high cohesion within the Data Access Layer, but it also minimizes the number of joins in corresponding stored procedures, thereby improving performance.

The data access components are implemented per data store. For example a SQL Server data access component will be able to access SQL Server stores, while an Oracle data access component will be able to access Oracle stores. This is done via a generic Data Access Helper Component. FIG. 29 illustrates this process.

Object/Relational Mapping

The system uses DataSets with column names that are identical to the column names of tables in the database. The reasons for choosing this approach are twofold. First, the strongly typed DataSets that are used in the APO system are generated from stored procedures in Visual Studio. Second, this approach saved development time by allowing developers to avoid having to create a mapping object for each Data Access method.

Data Abstraction Layer

The system implements a data interface abstraction layer that separates the logic of the application from the functions that retrieve data from a database. This abstraction is achieved through the concept of "polymorphism through interfaces".

The Data Abstraction Layer (which is really a sub-layer within the Data Access Layer) is responsible for creating the appropriate Data Access Object at runtime and returning the interface for that object to the caller (which will be a business service class).

This strategy supports "programming to interfaces, not implementations" which is a very common and important construct of object-oriented design. This design essentially abstracts the business layer from the data access layer.

Responsibilities
Provides Data Source Abstraction
Data Validation
Optimizes Data Access
See FIG. 30.
Guidelines In developing this Data Access Layer, the team's primary goals are to maximize performance and reusability and to minimize complexity and maintenance. When developing Data Access components, the following rules should be adhered to:

Each DAL component would only deal with one specific entity

When in doubt, use context to determine where the Data Access for join tables should be placed. For example, the method that retrieves Project-Question Set data is placed in the Project DAL component since the relationship is in the context of a particular project.

Business Entities

Most applications require data to be passed between components. For example, in the system, a list of projects must be passed from the data access logic components to the user interface components, so that the project list can be displayed to the users. The data is used to represent real world business entities, such as Projects or Portfolios.

The .NET Framework provides different ways to represent business entities in applications:

XML—You use an XML string or an XML Document Object Model (DOM) object to represent business entity data. XML is an open and flexible data representation format that can be used to integrate diverse types of applications.

Un-Typed DataSet A DataSet is an in-memory cache of tables, obtained from a relational database or an XML document. A Data Access Logic Component can use a DataSet to represent business entity data retrieved from the database, and you can use the DataSet in your application.

Typed DataSet—A typed DataSet is a class that inherits from the ADO.NET DataSet class and provides strongly typed methods, events and properties to access the tables and columns in a DataSet.

Business Entity Component—This is a custom class to represent each type of business entity. You define fields to hold the business entity data, and you define properties to expose this data to the client application. You define methods to encapsulate simple business logic, making use of the fields defined in the class. This option does not implement CRUD methods as pass-through methods to the underlying Data Access Logic Component; the client application communicates directly with the Data Access Logic Component to perform CRUD operations.

Business Entity Component with CRUD behaviors—You define a custom entity class as described previously, and you implement the CRUD methods that call the underlying Data Access Logic Component associated with this business entity.

The system uses strongly-typed datasets to pass data throughout the system.

Transaction Handling

A very important issue when designing a business layer is how to manage transactions. Many business methods call multiple DAL methods internally to update, insert, or delete multiple records, potentially in multiple tables. Multiple calls must run within a transaction, so that if one fails, all actions performed by previous methods are rolled back. Otherwise data will be inconsistent, and/or incorrect. We use the System.Transactions namespace that provides a modem, managed interface to handle transactions.

Transactional context is managed by the root and Web service methods act as the root of a distributed transaction. If an exception is thrown while the XML Web service method is executing, the transaction is automatically aborted; conversely, if no exception occurs, the transaction is automatically committed.

Each object enlisted by the Web method is a child object and will participate in the transaction and "vote" on the outcome. This provides the best fit for keeping objects granular enough to manage their own data from a persistent store, while still allowing them to be orchestrated by a transaction-root controller. Child objects need nothing special. The same child object can be enlisted in a transaction for one Web method, but not be enlisted in a transaction for another Web method.

WEB Service Security Standard

Web Services inherently lack security features. In order to promote a

Service Oriented Architecture, Microsoft, IBM, and VeriSign have jointly published a specification called WS-Security that is designed to deal specifically with the issues surrounding Web service security.

WCF is a rich technology platform for building distributed systems, unifying messaging-style and RPC-style communication, efficient platform-optimized binary communication and open-standard based Web services, and a rich set of features enabling robust security, scalable and reliable communication paths and transactional processing.

The system uses user/password authentication tokens to authorize clients. This security layer prevents the web service methods from being invoked from a non-trusted source. It is also possible to implement a LDAP\AD scenario, and fully supports a single node LDAP configuration for authentication.

Exception Handling

When errors occur in .NET applications, the general advice is to throw exceptions rather than return error values from your methods. This advice has implications for the data access, business service, and web service layers along with the business entity components. There are two general kinds of exceptions that will occur:

Technical exceptions, which include:
ADO.NET
Connection to database
Resources (such as database) are unavailable
Other 'hard' errors
Business logic exceptions, which include:
Validation errors
Business logic errors The system only catches exceptions when it needs to specifically perform any of the following actions:

Gather information for logging

Add any relevant information to the exception

Execute cleanup code

Attempt to recover

There are two main processes for handling exceptions. FIG. 31 illustrates the basic steps that the system performs to handle an exception.

This process continues to occur as an exception propagates up the call stack. Any errors that occur within the system are propagated up to the Web Service level where they are handled. Please note that all try/catch blocks are implemented in the Web Services Layer (not in the Business Logic or Data Access Layers).

The system uses the Exception Management Application Block (EMAB). The EMAB is an application block designed to "publish" exception information. "Publishing" might involve recording the exception's details to a database, paging the system administrator, adding an entry to the Event Log, or some other custom task. The point is, with the EMAB, developers can indicate precisely what "publishing" an exception involves. This approach also prevents code from being tightly coupled with behavior since the exception publishing action is encapsulated in a separate class.

Third Party Vendors

At times it makes sense to embed third party applications or assemblies into an application instead of inventing them yourself. The system does implement a third party product to fulfill a very specific business need of dashboarding and reporting.

The system supports two modes for the third party integration:

Fat Client

Uses a one-time small download OCX for IE6 and above

Gives the user a rich dashboarding and reporting experience

Zero Footprint Client

Limited functionality for custom dashboards

No functionality for server or custom reporting

No download

Those skilled in the art who have reviewed the present disclosure will readily appreciate that the system and methods defined above can be implemented on a variety of computer hardware and software. The communication within the solutions domain can take place over the Internet, an intranet, or any other suitable network. The key differentiators of the system and methods are as follows:

(a) it is a fundamentally revolutionary approach to generically implementing an intelligent control room philosophy in software systems and;

(b) the development platform extensibility which enables authorized users to add new domains of entities and operational logic to the system without the need for programming.

The preferred embodiment of the invention has been described in detail above. Those skilled in the art who have reviewed the present disclosure will readily appreciate that the features of the invention can be implemented in a different order from that disclosed herein. Therefore, the present invention should be construed as limited only by the appended claims.

APPENDIX A

Brief Descriptions of Drawings

The following is a brief description of the drawings shown in FIGS. 1 through 31.

Figure 1:
FIG. 1 is a graphic depicting the basic tenants of the system which are visibility, control and governance fed by operational data and human feedback through a series of three categories, knowledge and experience, checklists and best practices, and team communications.
Figure 2:
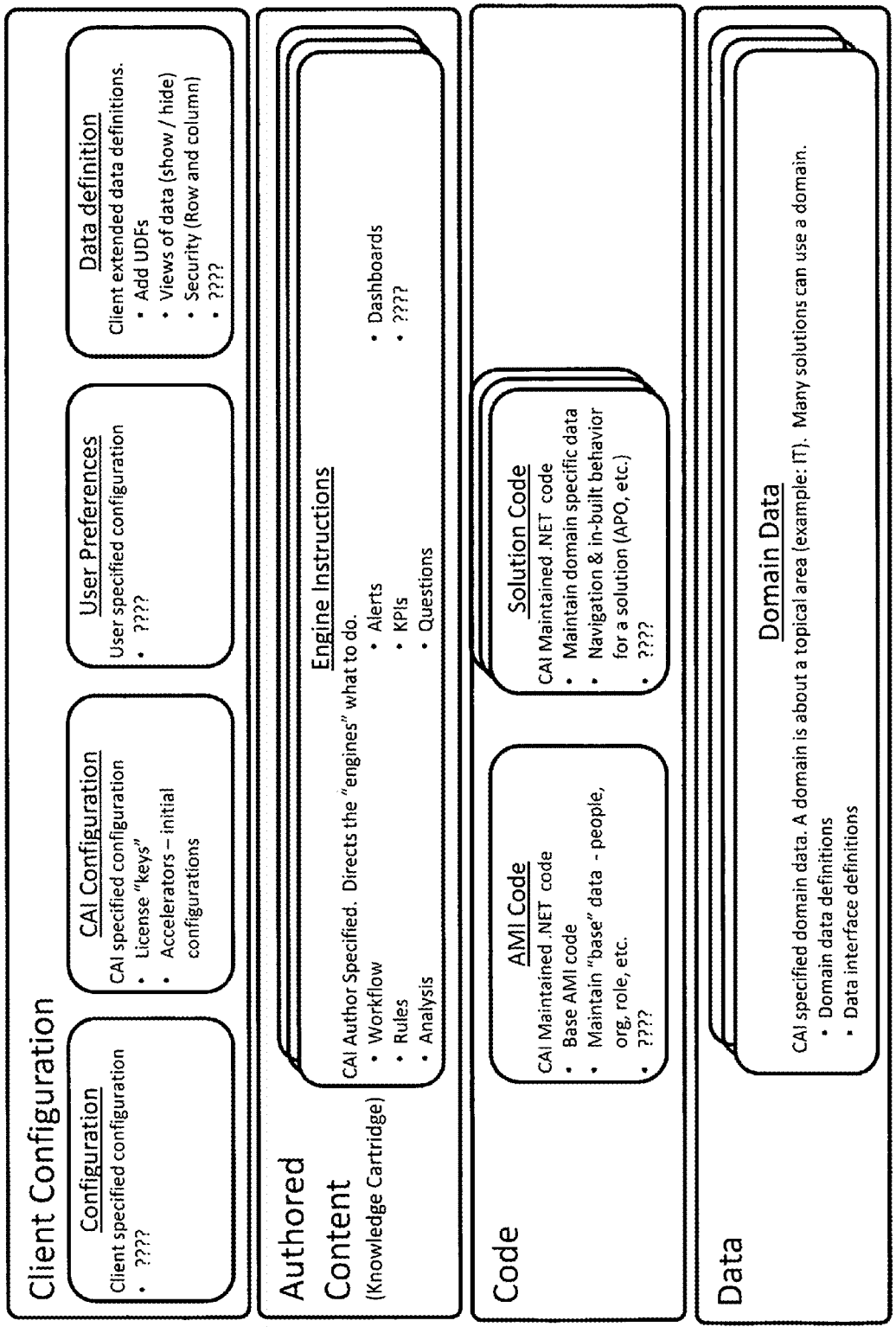
FIG. 2 is a graphic depicting the architecture the system follows with a sophisticated strategy for software as a service (SAAS) by utilizing a well-defined 4 tier architecture governing its design, deployment and operation.
Figure 3:
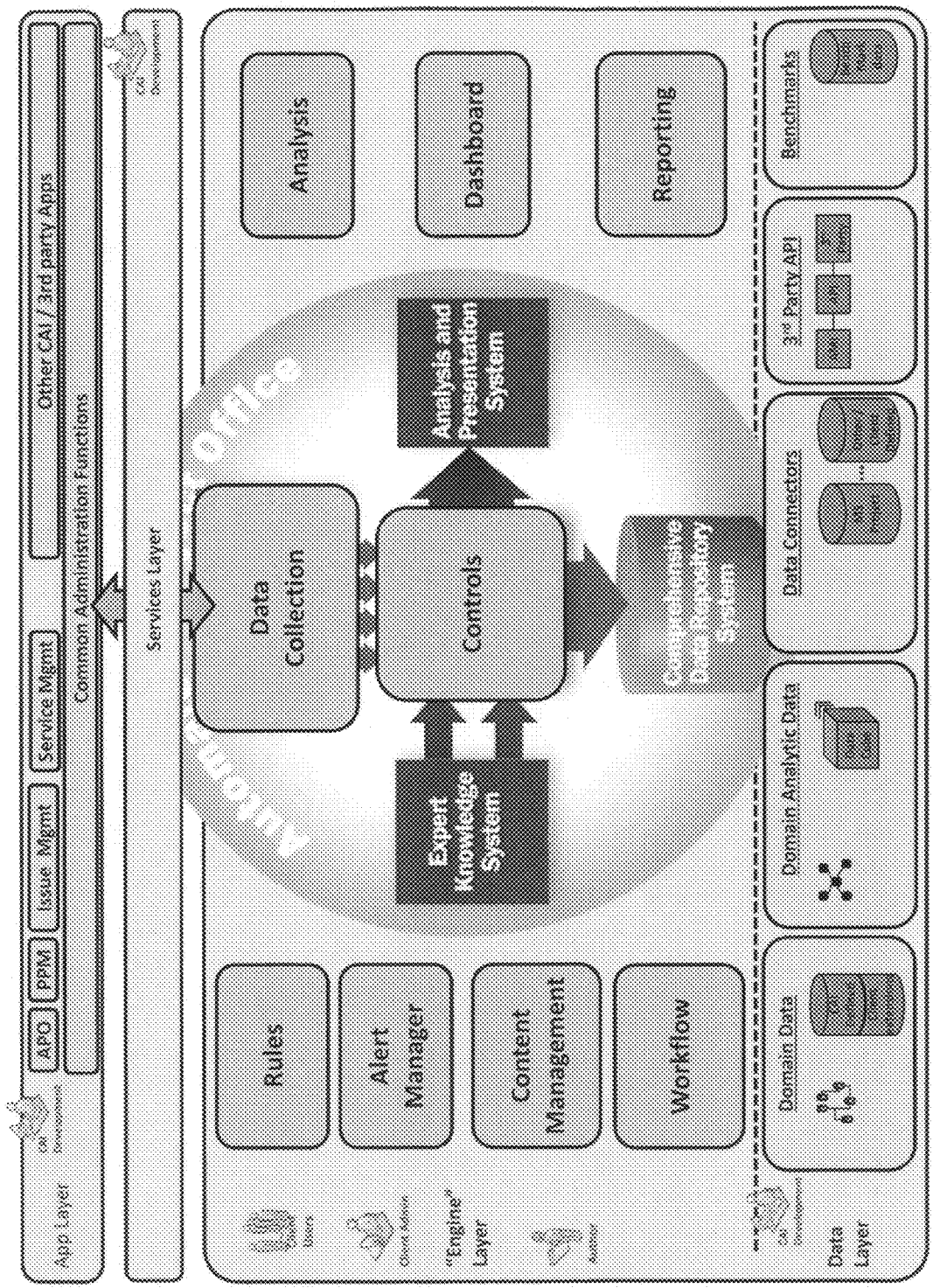
FIG. 3 is a graphic depicting the Intelligent Control Room concept of intelligent governance which is at the heart of the system.
Figure 4:
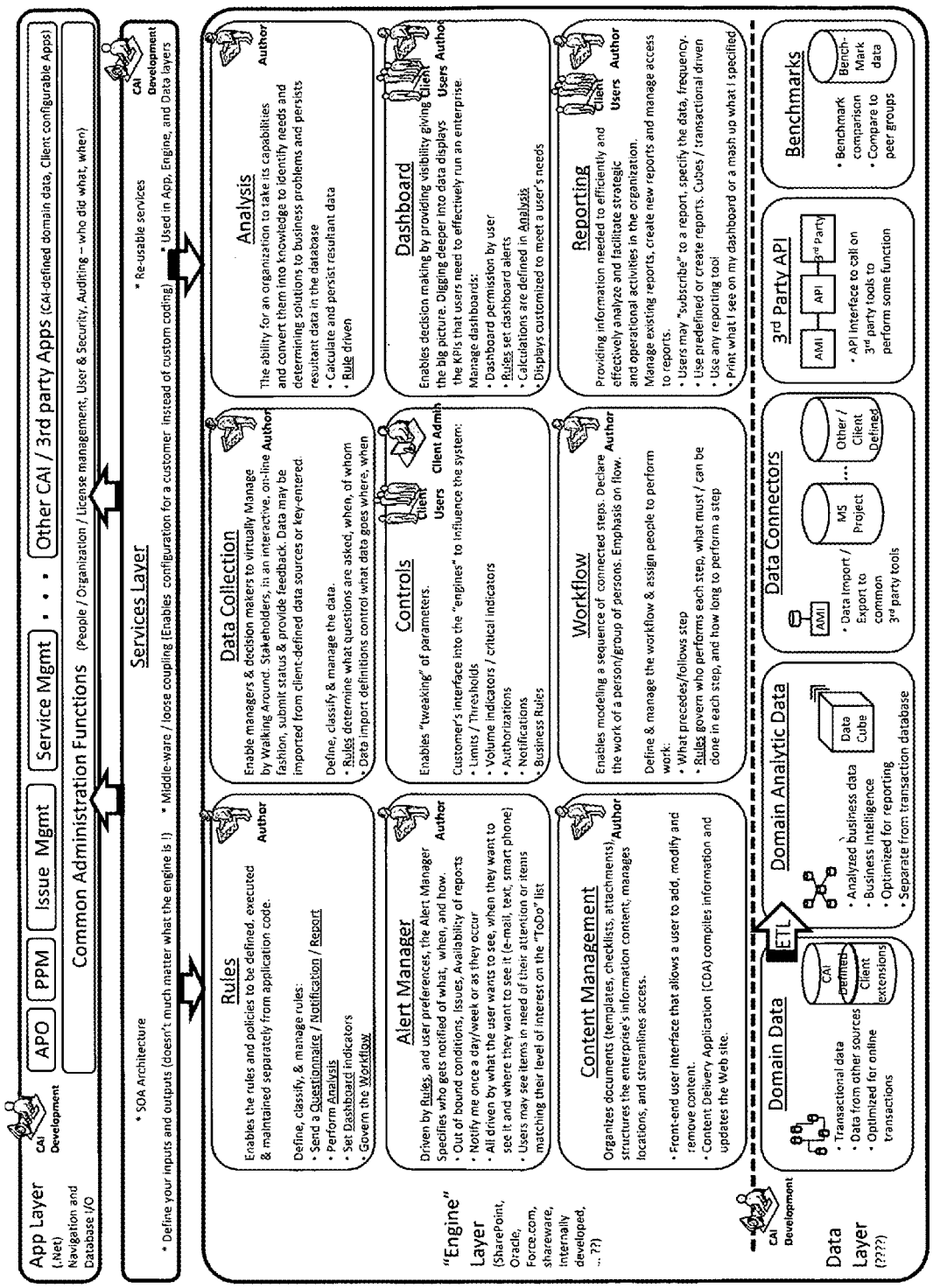
FIG. 4 is a graphic depicting the system's feature set found in each layer.
Figure 5:
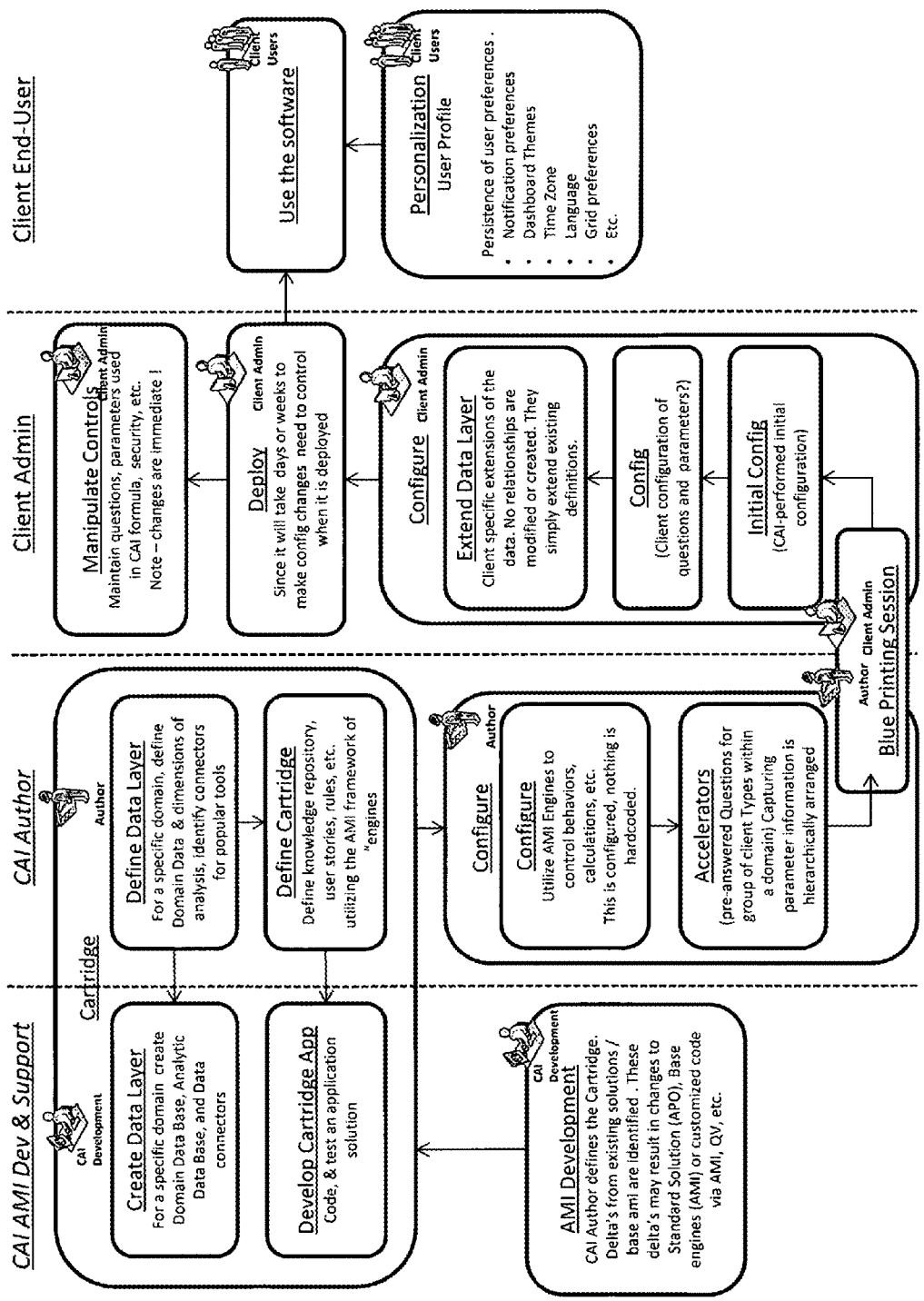
FIG. 5 is a graphic depicting the various roles and actions available to these roles in the system.
Figure 6:
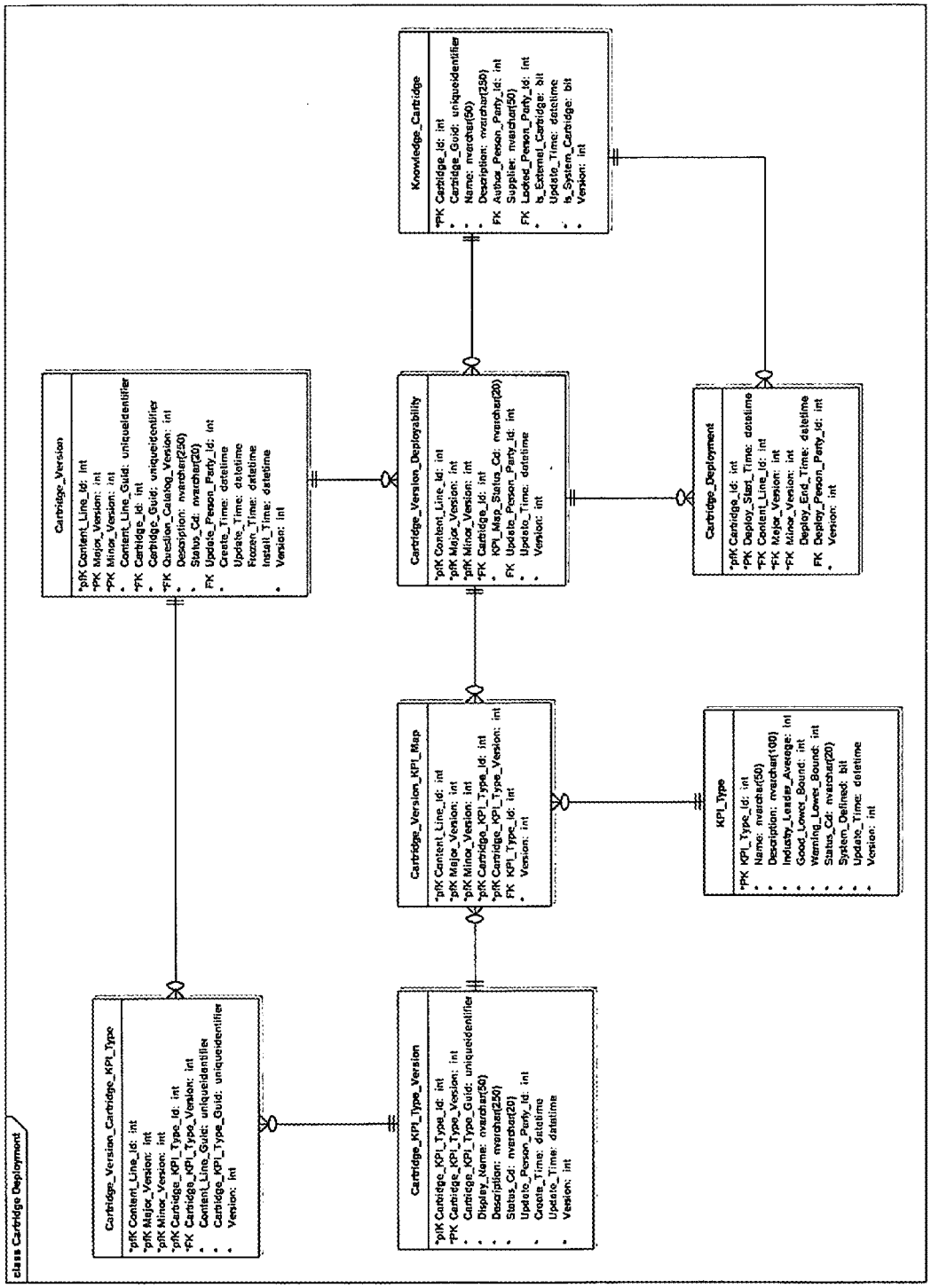
FIG. 6 is a graphic depicting the database model necessary to implement the cartridge deployment features.
Figure 7:
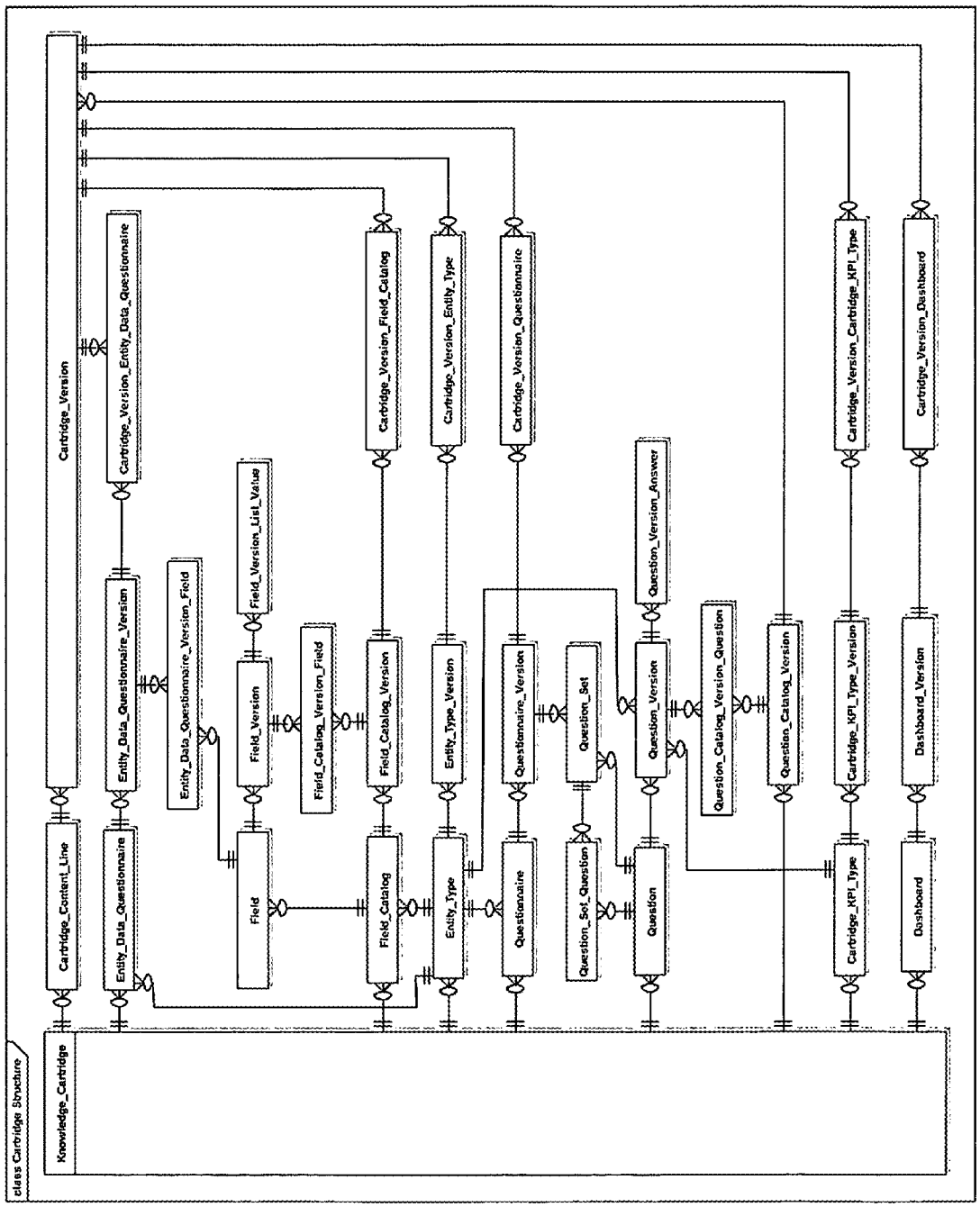
FIG. 7 is a graphic depicting the database model for the actual cartridge structure.
Figure 8:
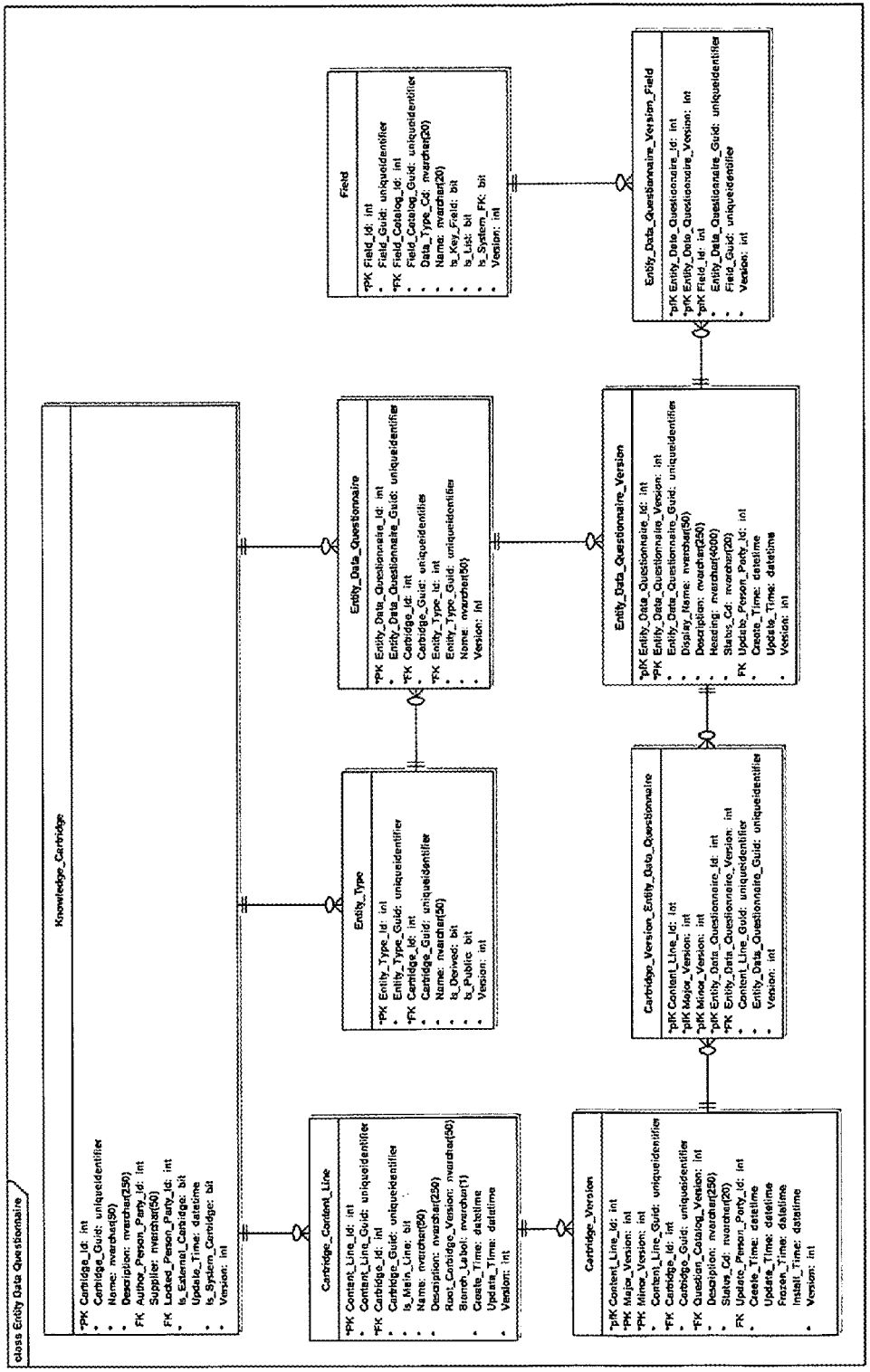
FIG. 8 is a graphic depicting the entity data questionaire database model which ties knowledge cartridges to questionaires that support their operation.
Figure 9:
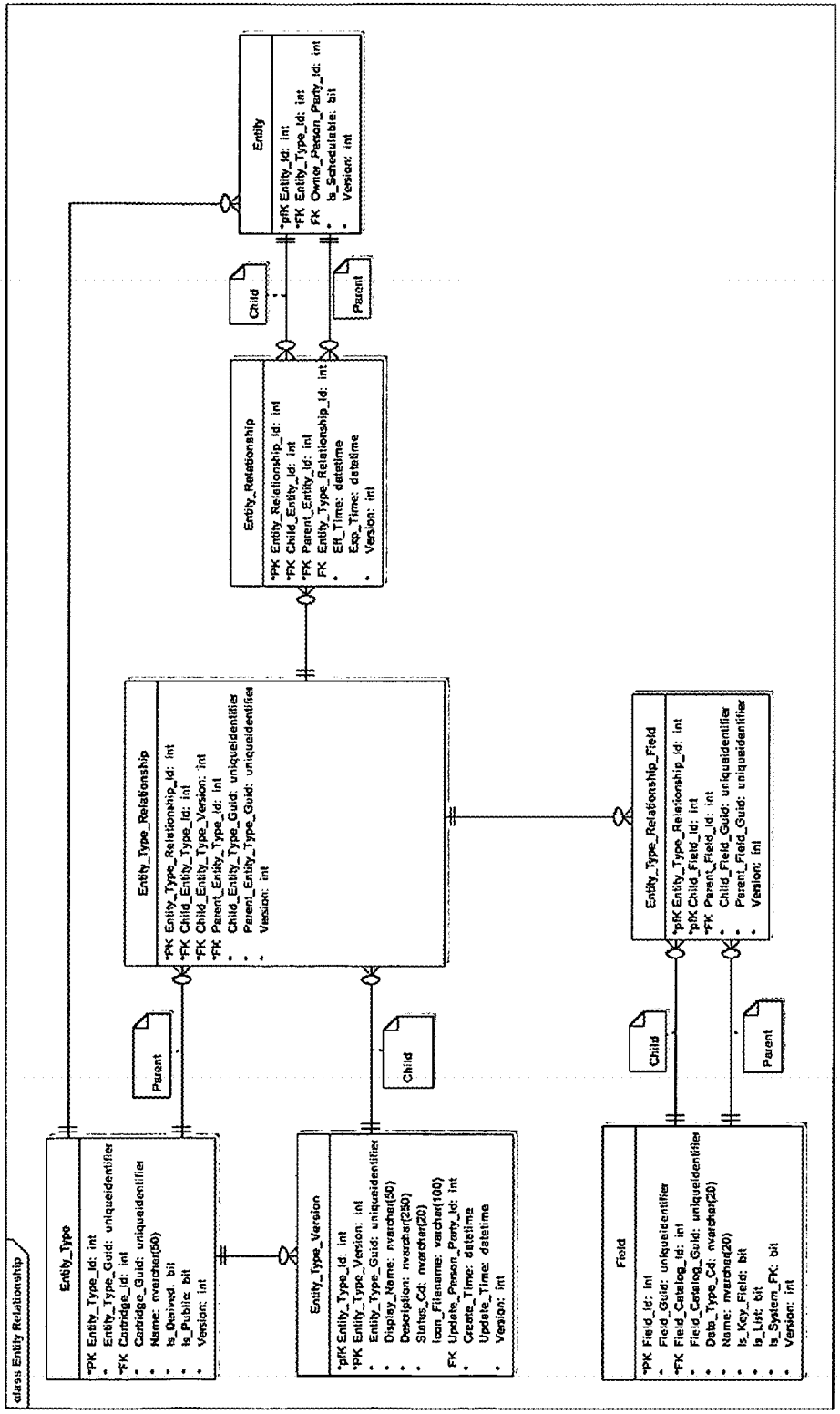
FIG. 9 is a graphic depicting the entity relationship database model. This model is responsible for beginning the extension of the underlying relational database management system's original logical model to include new domains of information previously unknown during the original system configuration.
Figure 10:
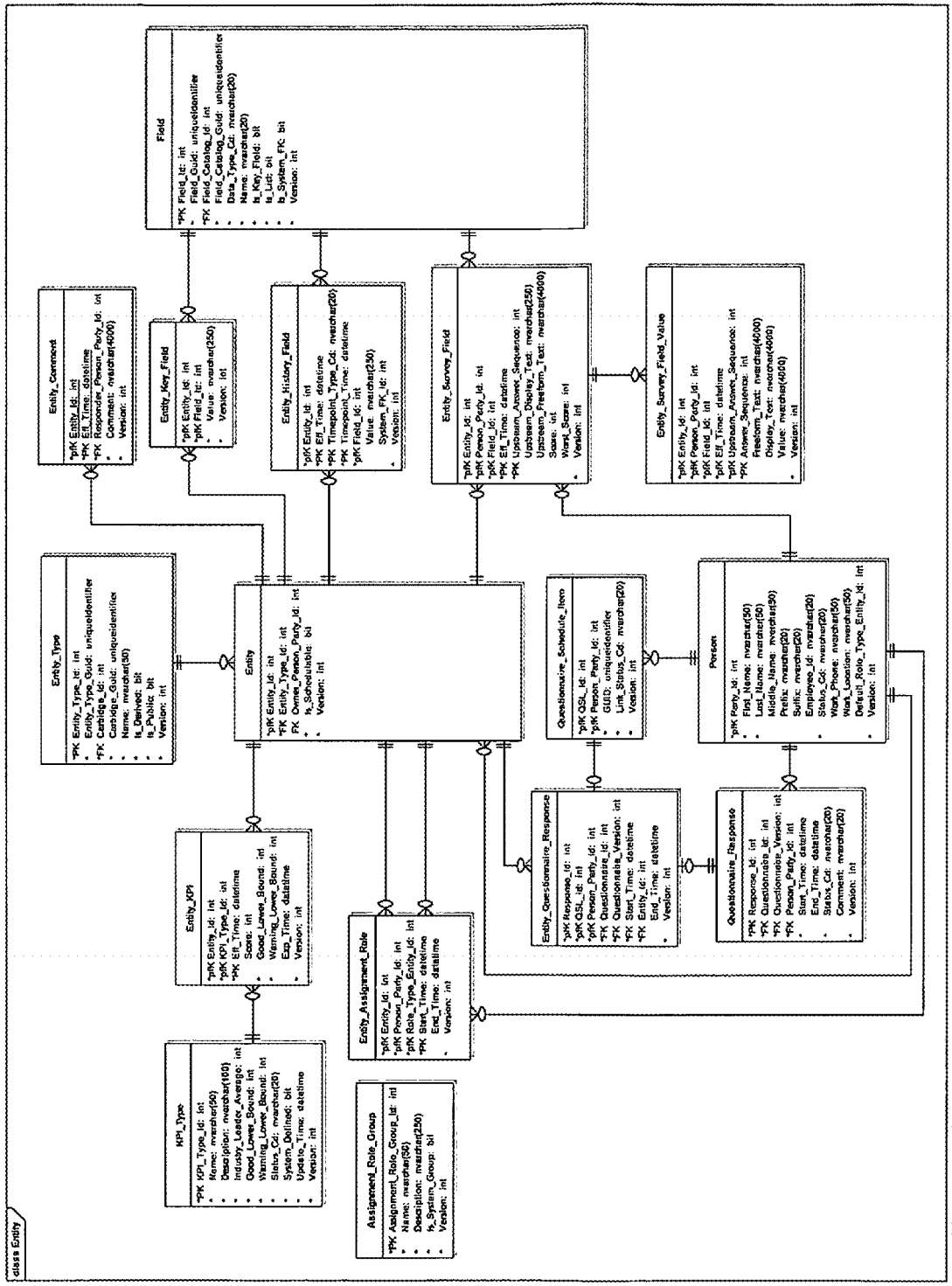
FIG. 10 is a graphic depicting the entity database model. This model implements the underlying constructs for the objects to be added to the system to support the extensibility of the development platform's functional enhancement without programming concept.
Figure 11:
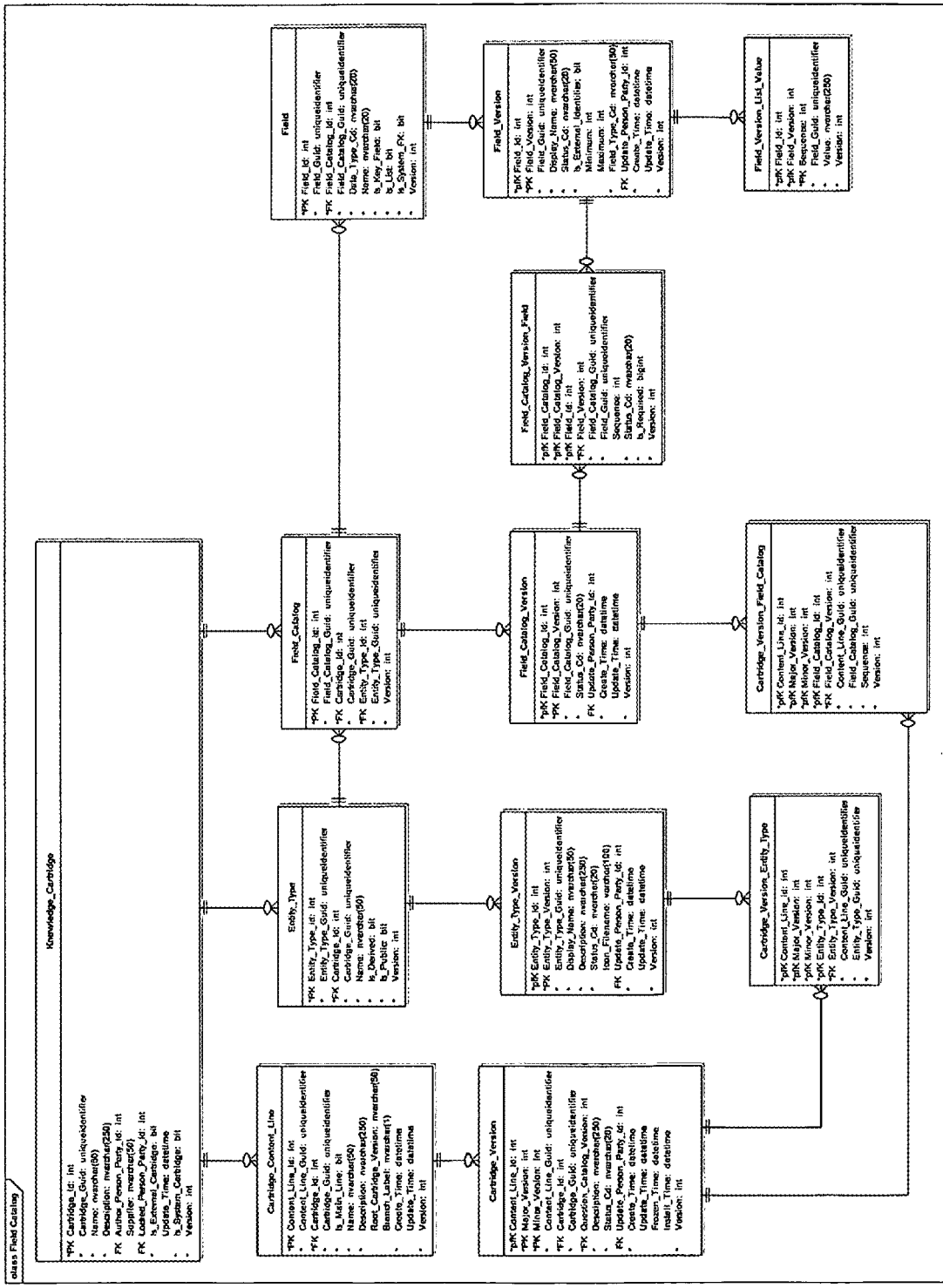
FIG. 11 is a graphic depicting the field catalog database model.
Figure 12:
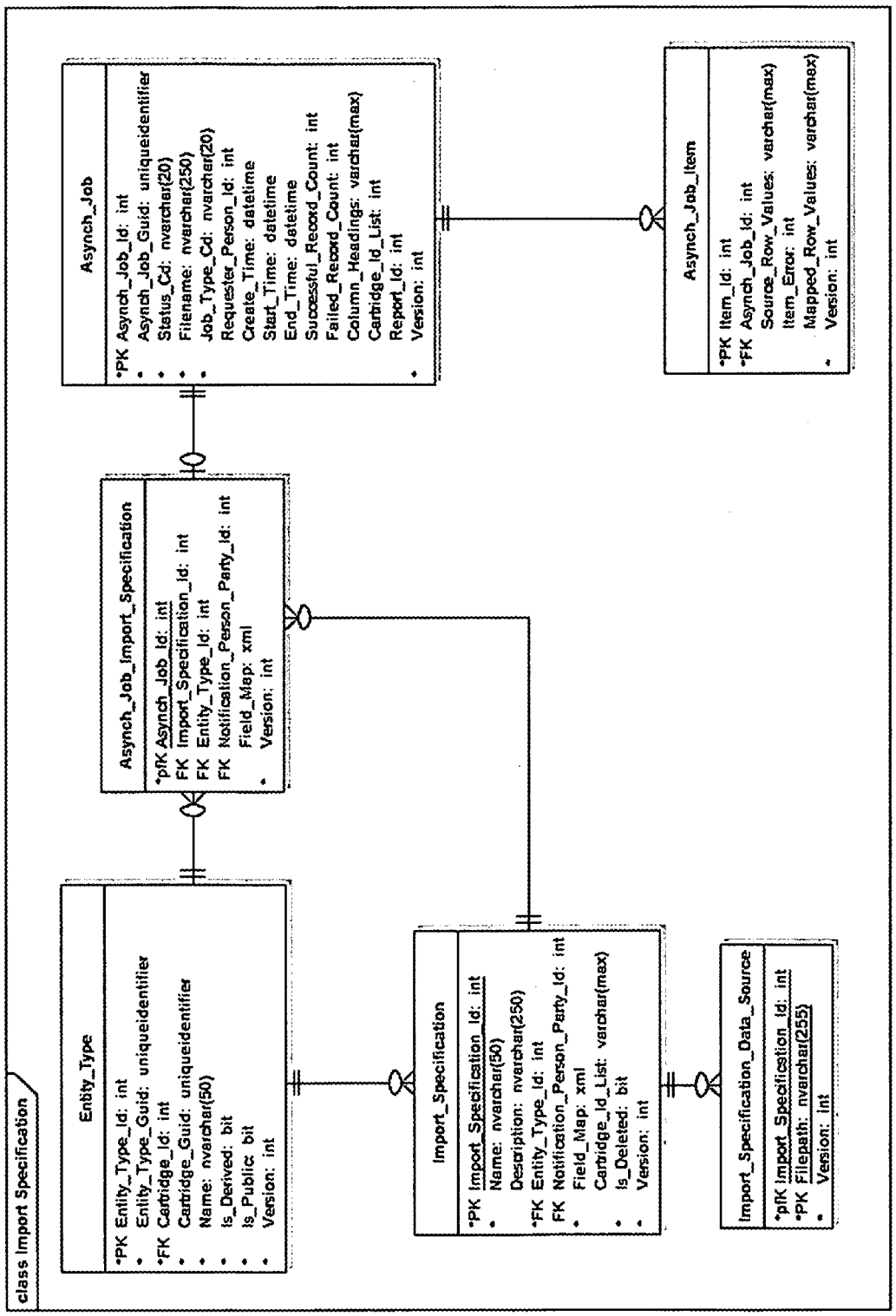
FIG. 12 is a graphic depicting the database model that supports the loading of imported data into the system from other sources like preexisting systems of record.
Figure 13:
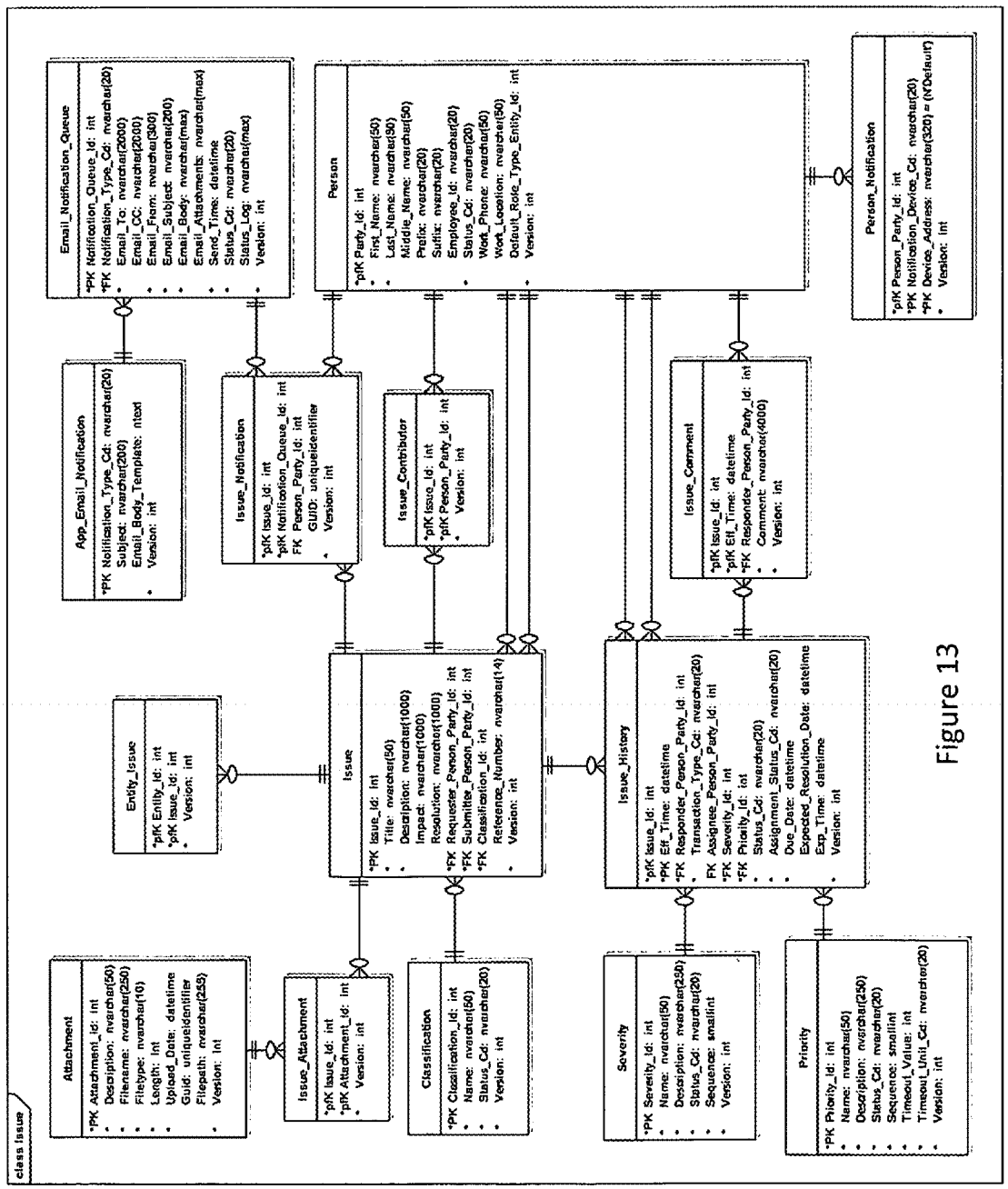
FIG. 13 is a graphic depicting the database model that defines the entities necessary to support the issues function in the system.
Figure 14:
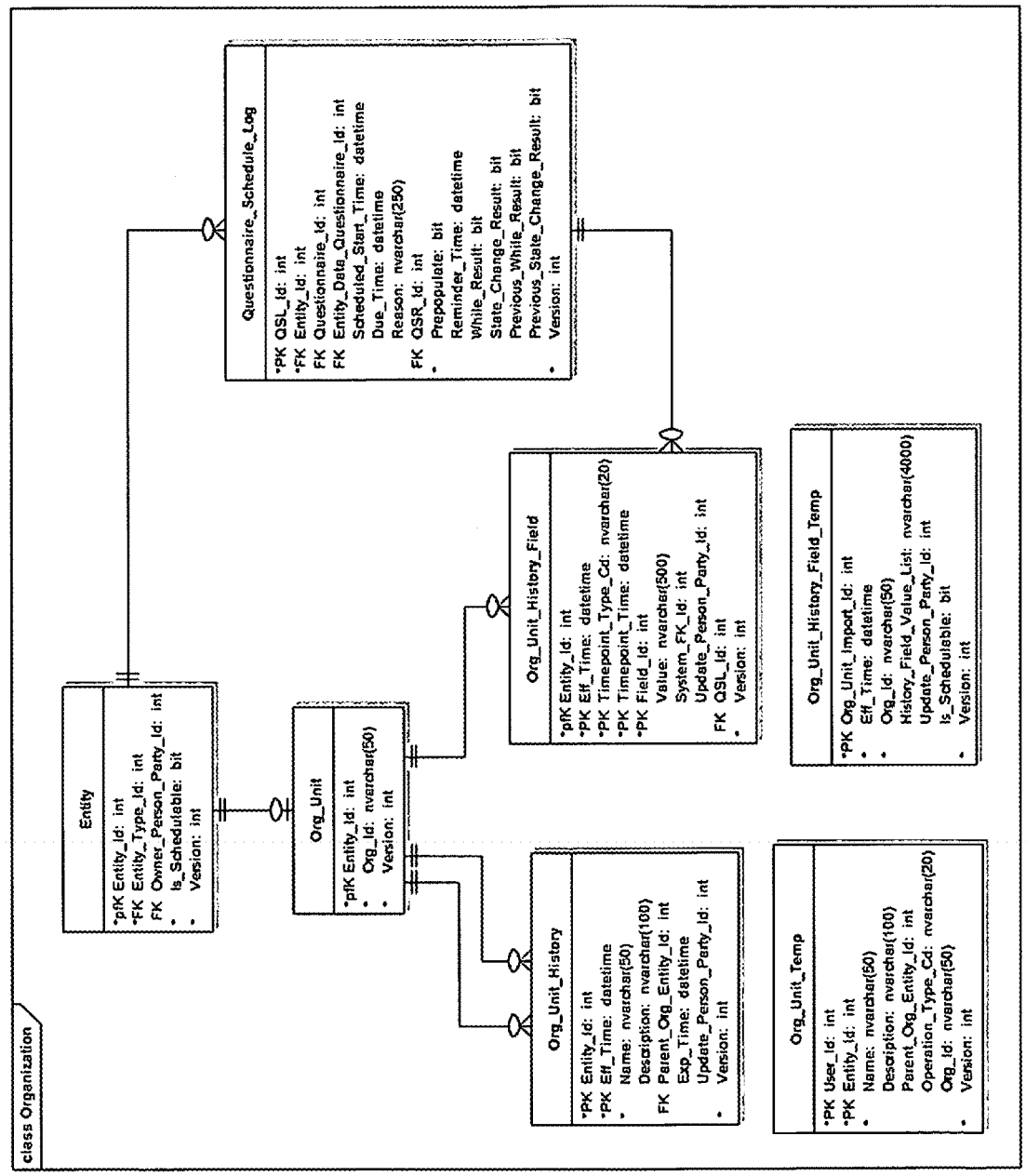
FIG. 14 is a graphic depicting the organization database model.
Figure 15:
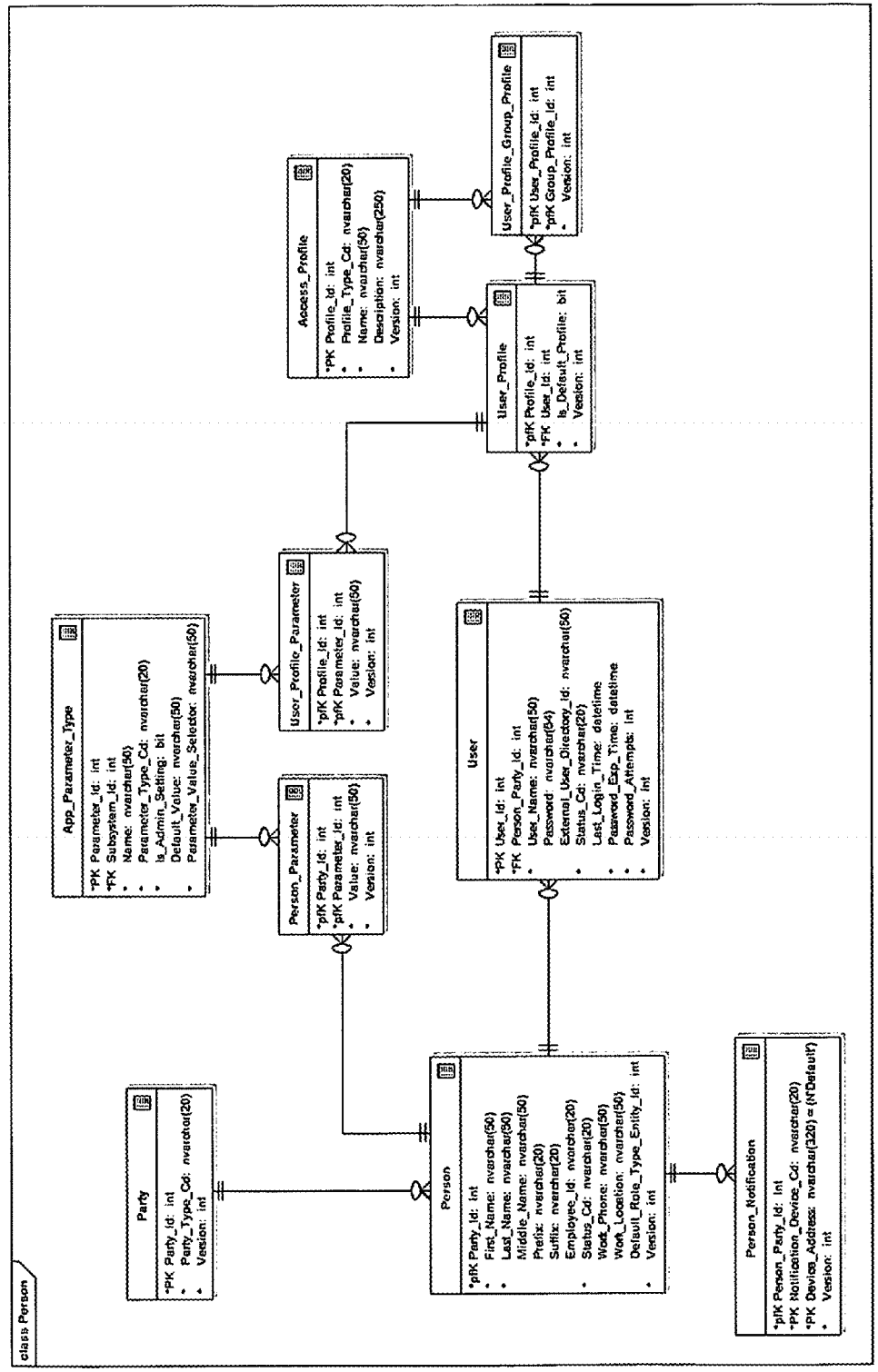
FIG. 15 is a graphic depicting the person database model.
Figure 16:
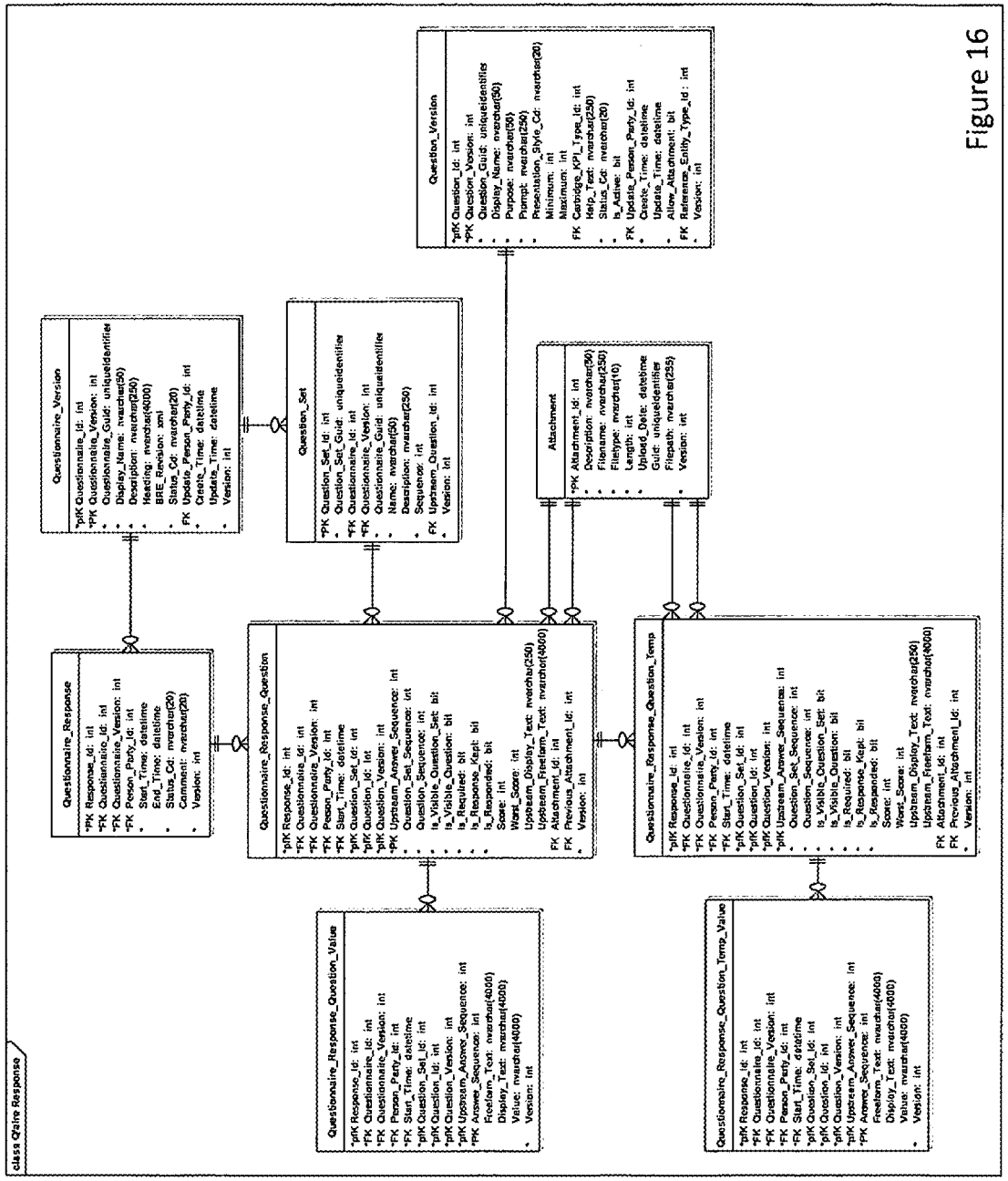
FIG. 16 is a graphic depicting the questionnaire response database model.
Figure 17:
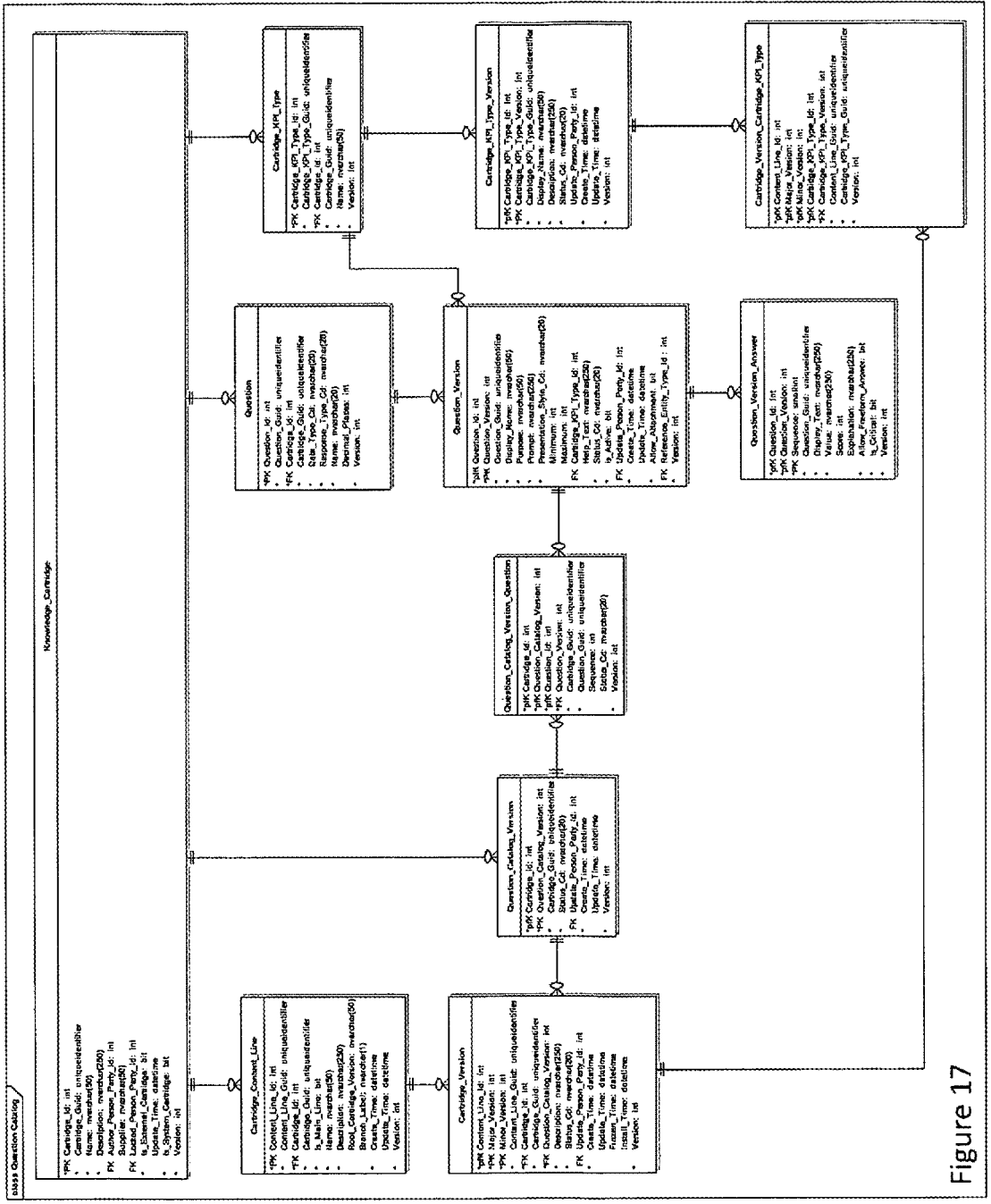
FIG. 17 is a graphic depicting the questions catalog database model.
Figure 18:
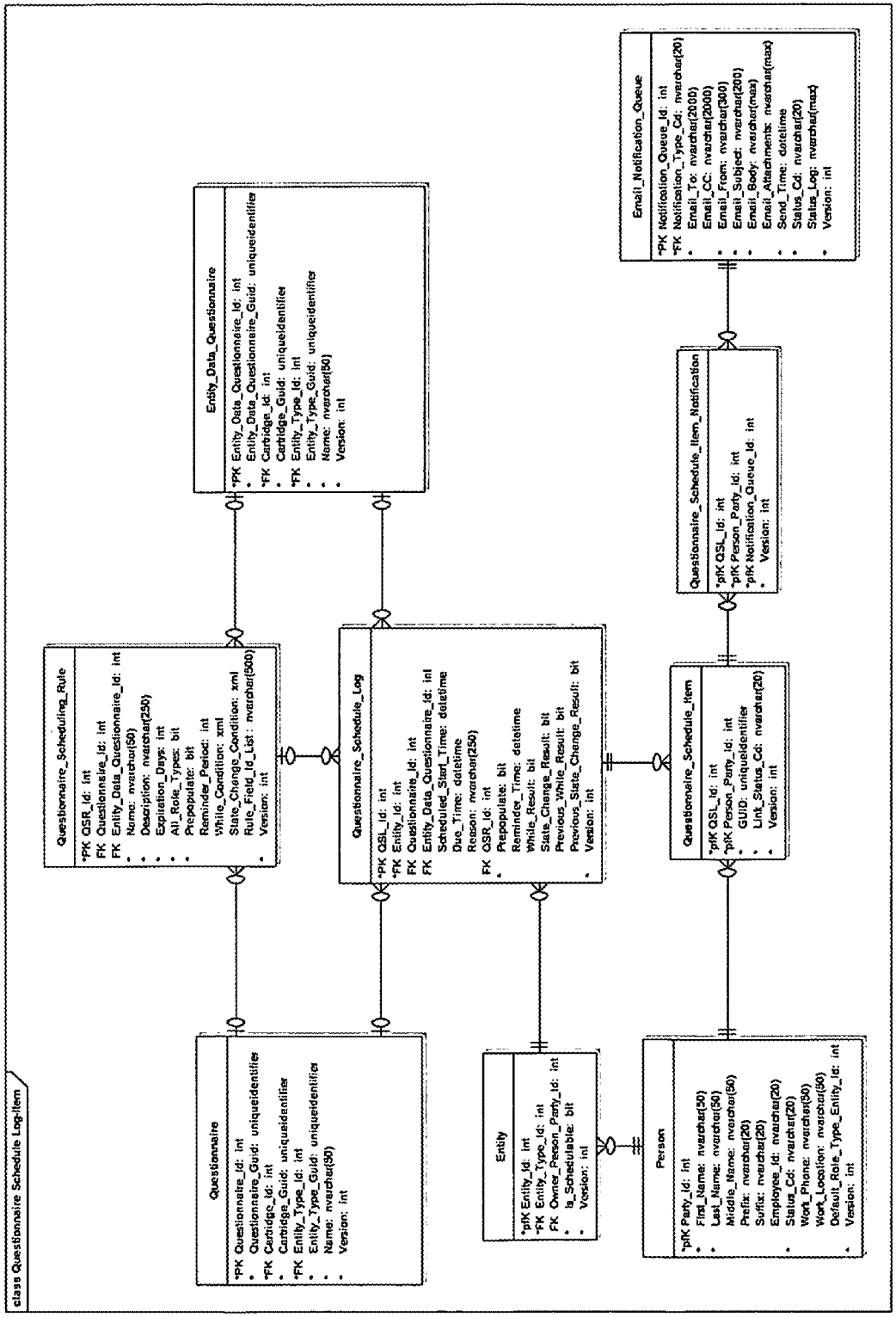
FIG. 18 is a graphic depicting the questionnaire schedule log item database model.
Figure 19:
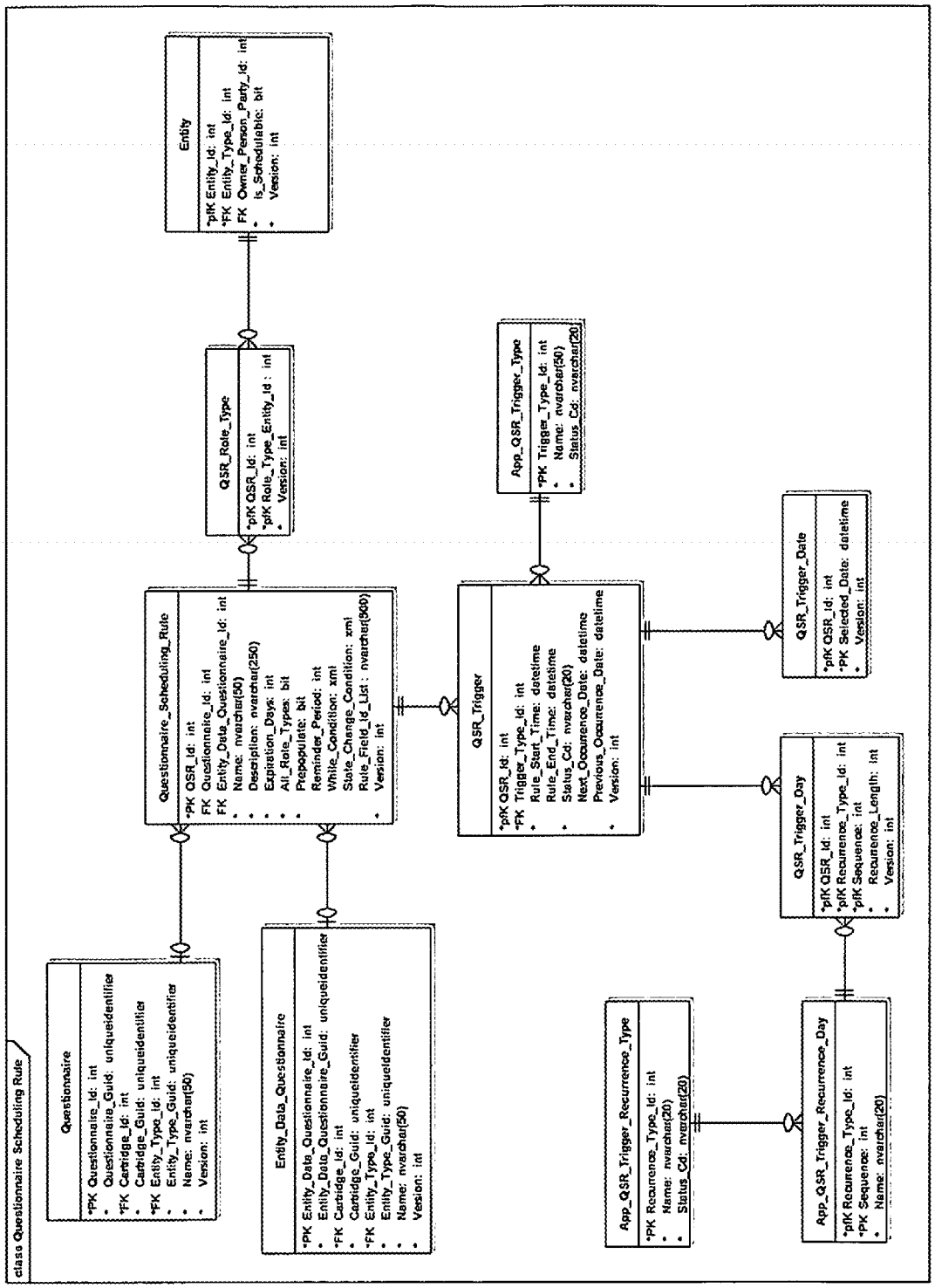
FIG. 19 is a graphic depicting the questionnaire scheduling rule database model.
Figure 20:
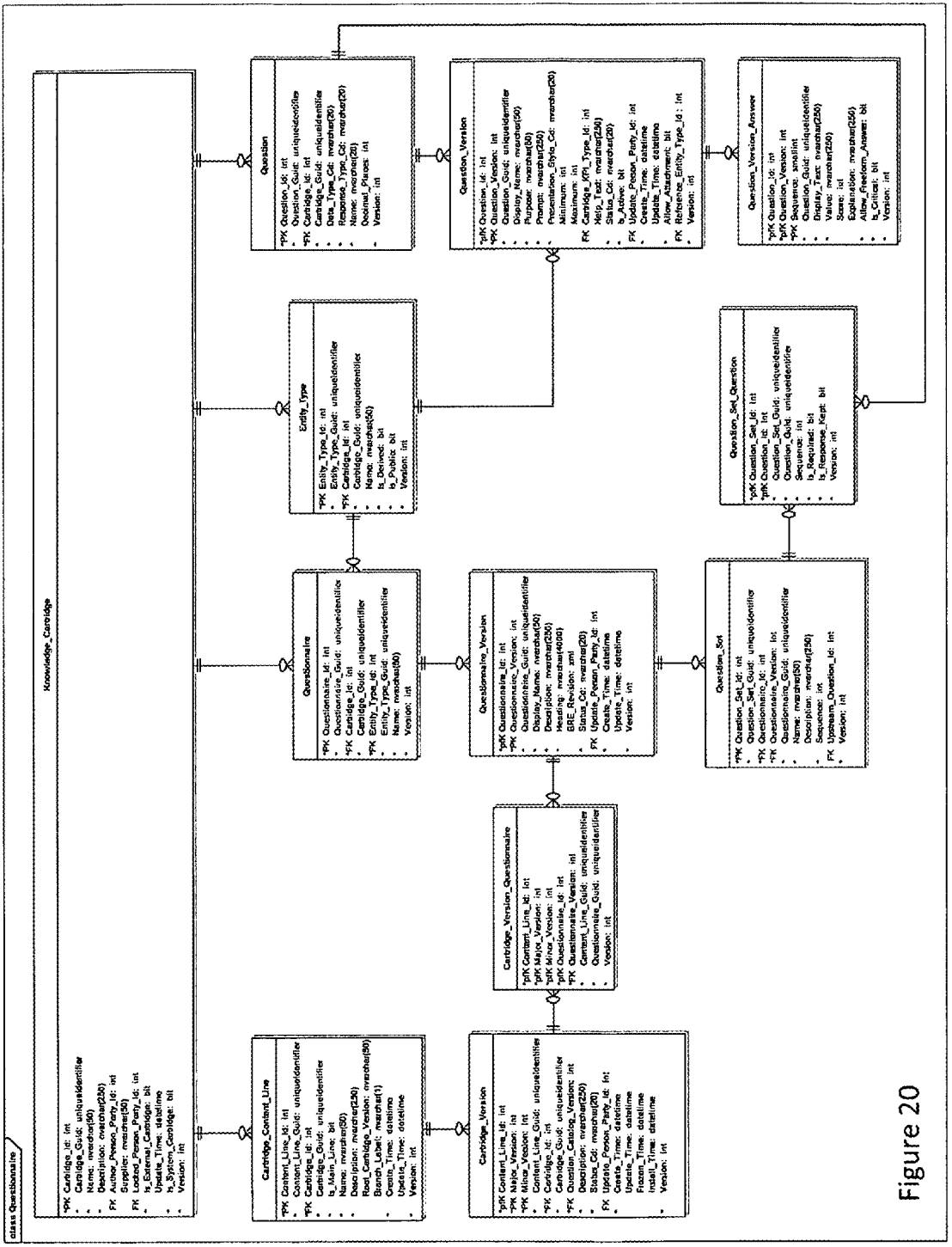
FIG. 20 is a graphic depicting the questionnaire database model.
Figure 21:
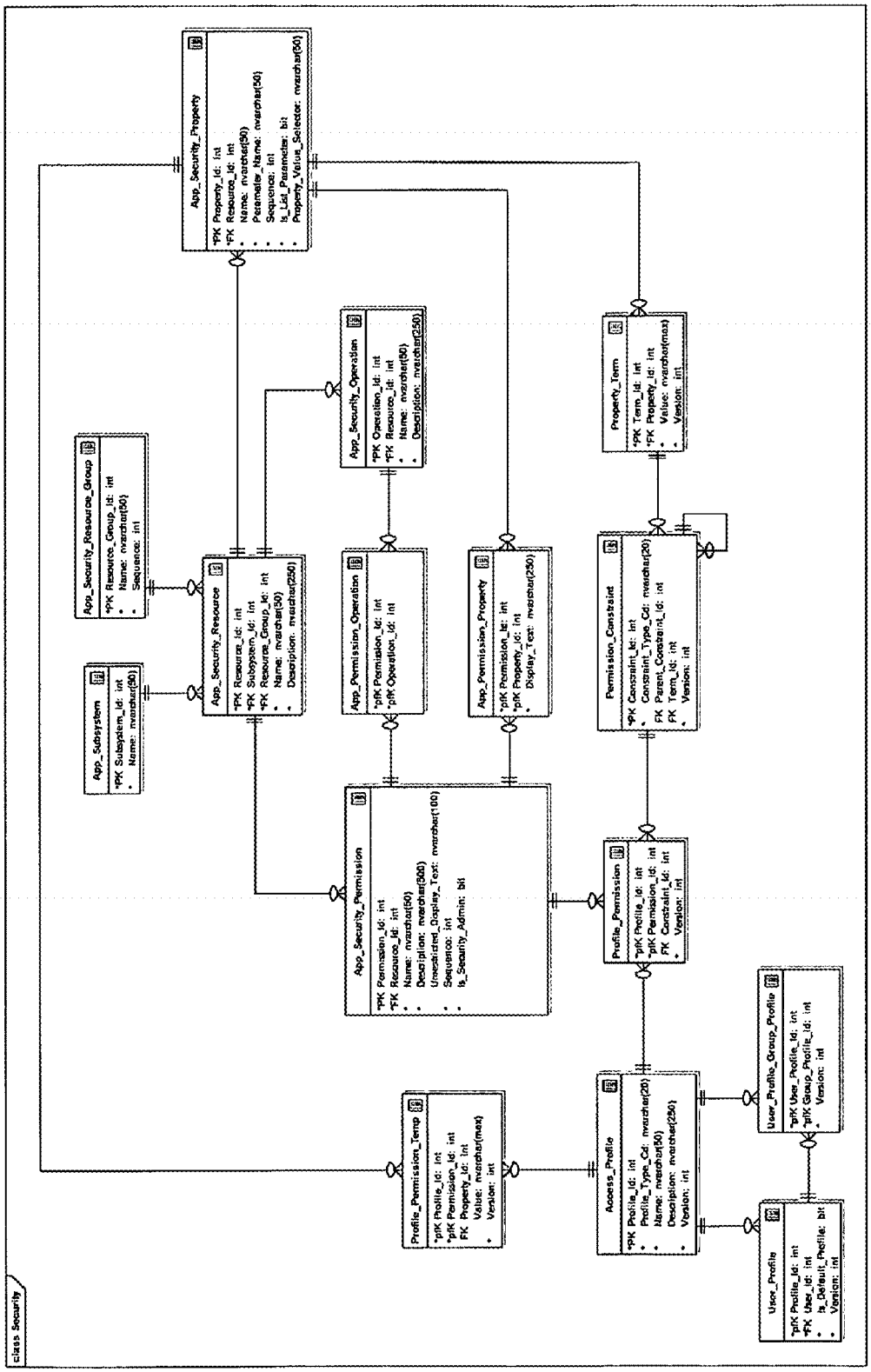
FIG. 21 is a graphic depicting the security database model.
Figure 22:
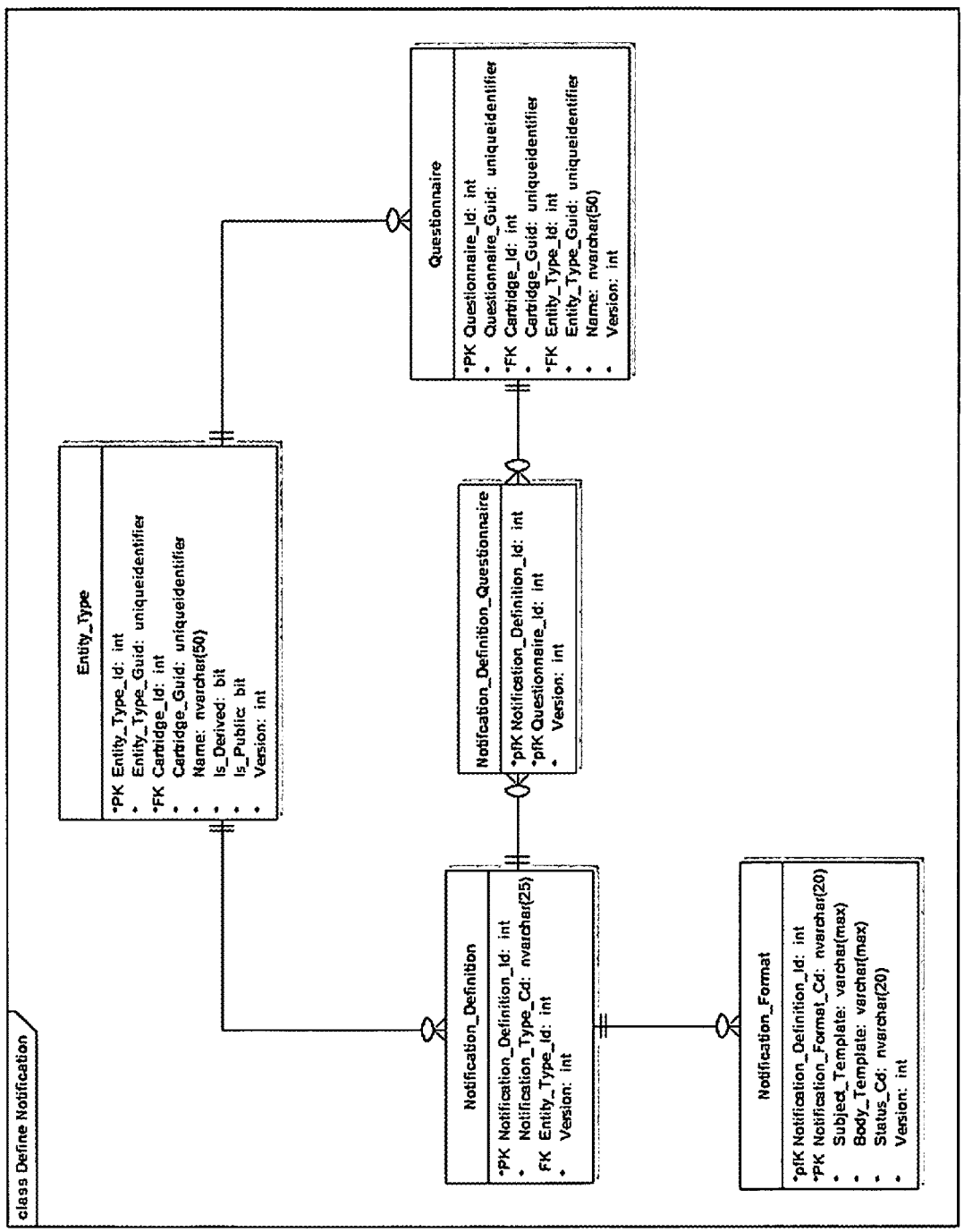
FIG. 22 is a graphic depicting the define notification database model.
Figure 23:
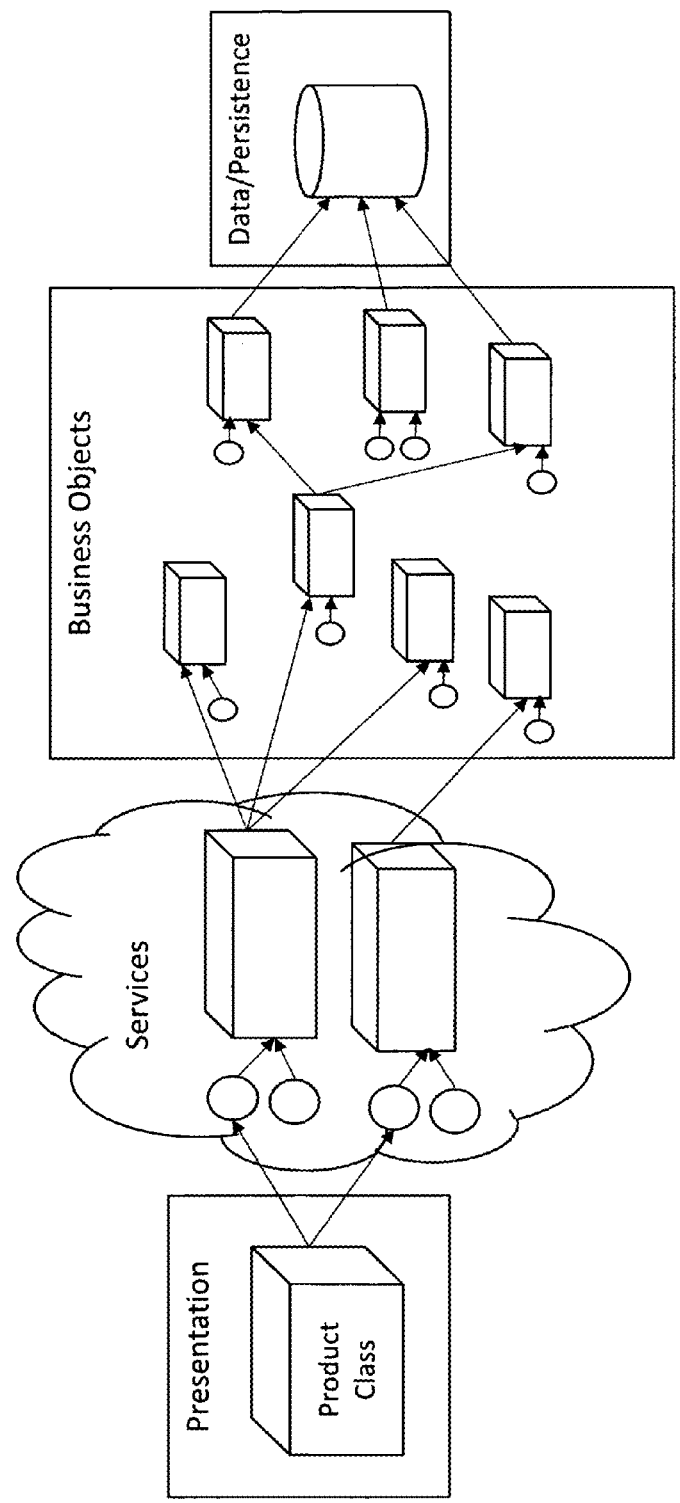
FIG. 23 is a graphic depicting the system's service-oriented model, where a further "layer of indirection" is introduced. The services layer provides black-box functionality.
Figure 24:
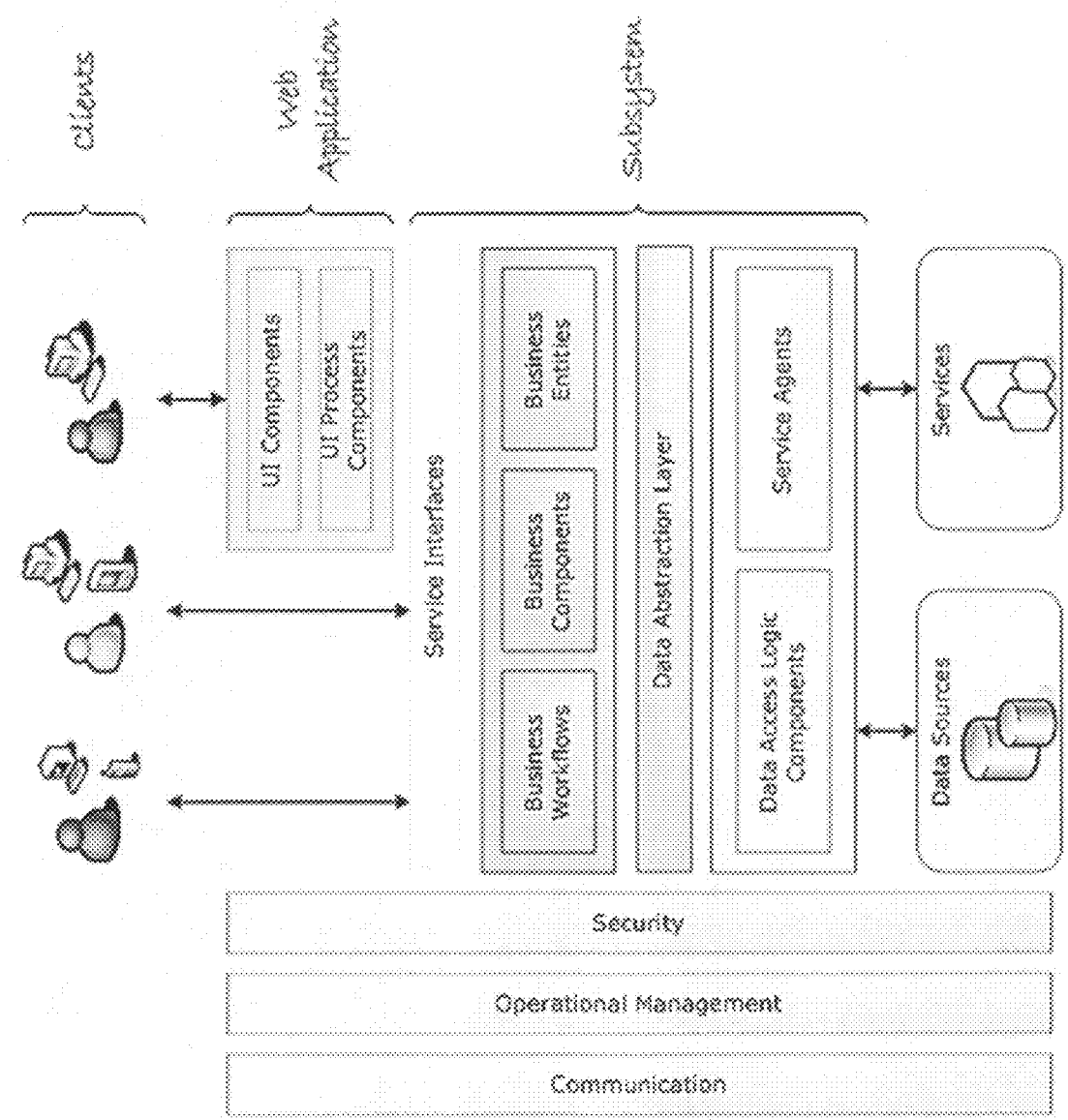
FIG. 24 is a graphic depicting the logical layers of the system.
Figure 25:
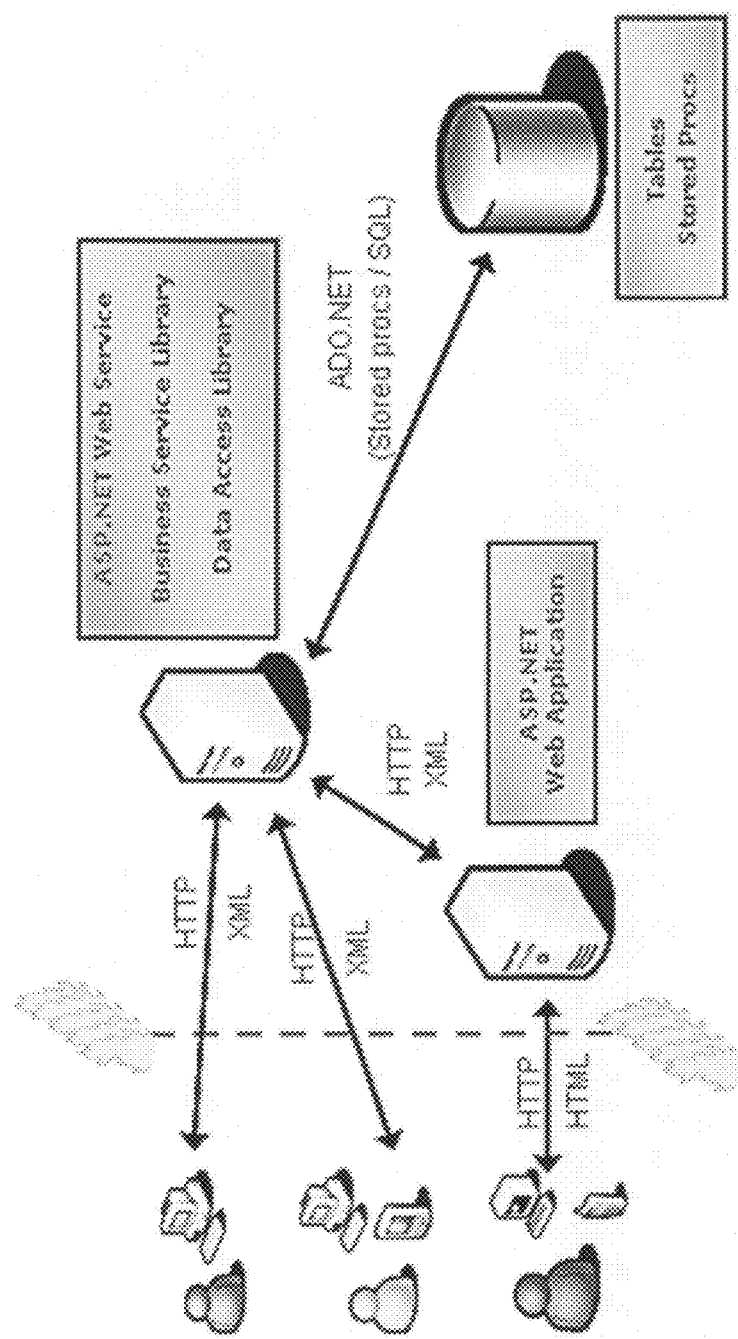
FIG. 25 is a graphic depicting the standardized interface concept with which the system is configured.
Figure 26:
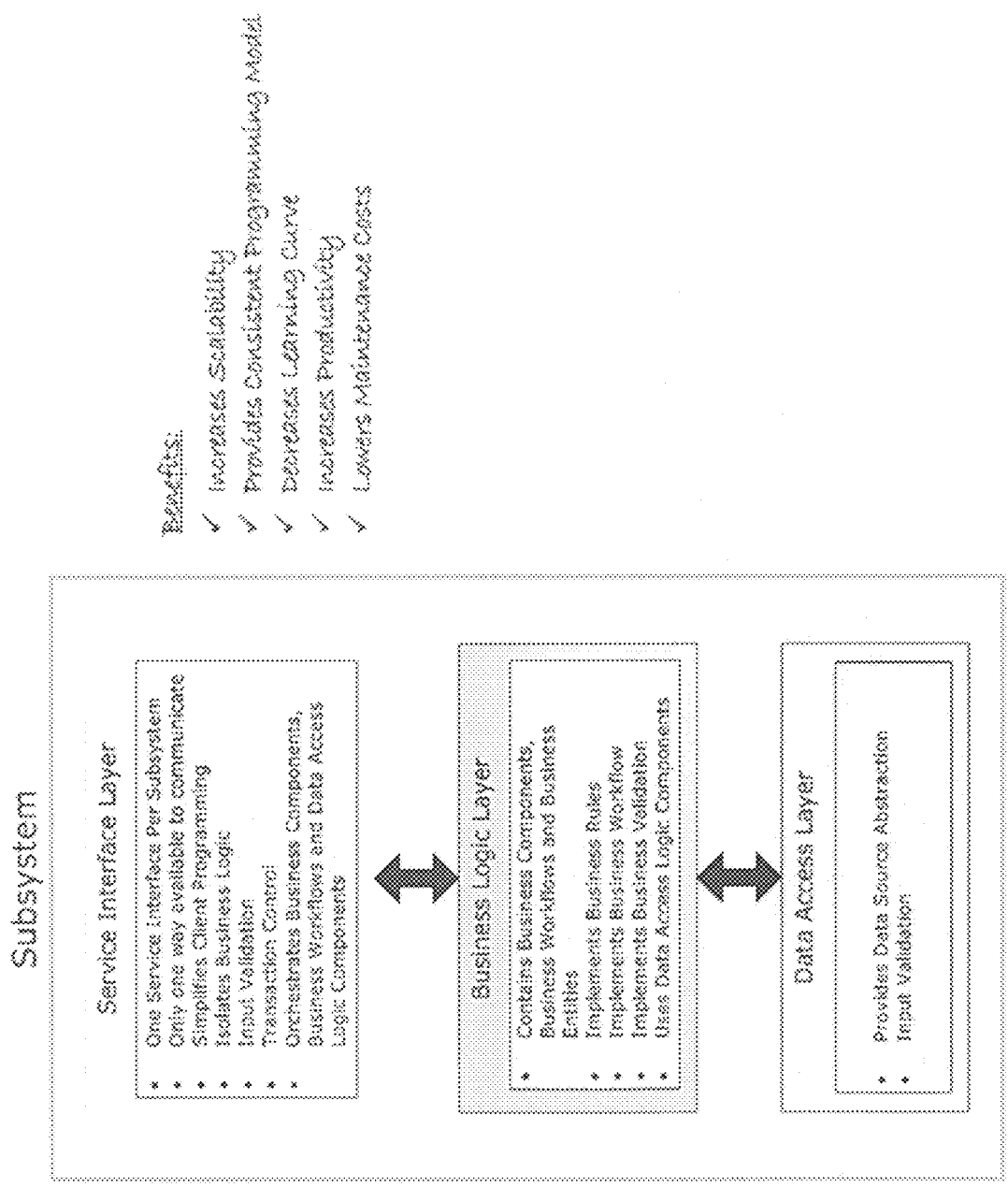
FIG. 26 is a graphic depicting some of the basic responsibilities of each layer in the system.
Figure 27:
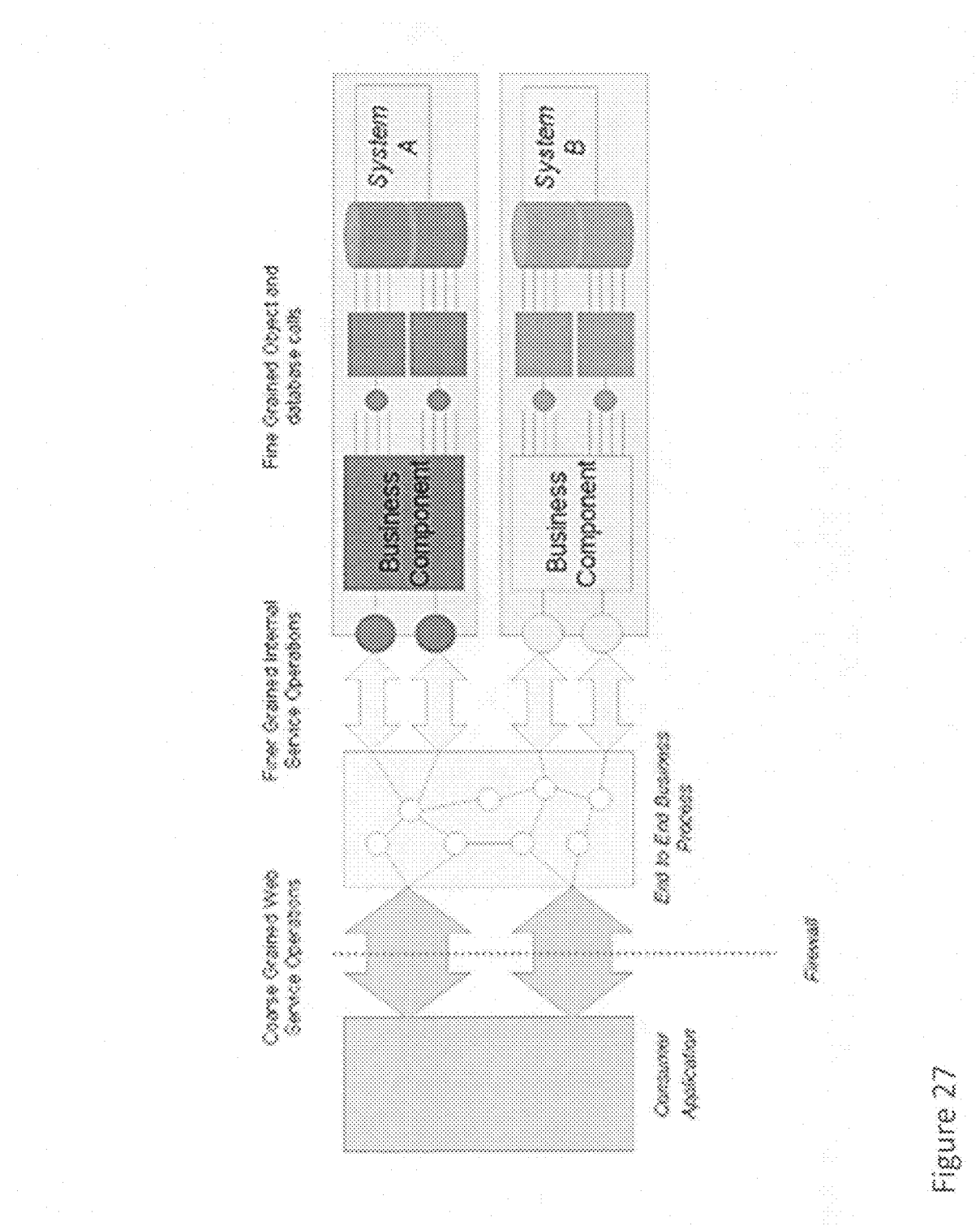
FIG. 27 is a graphic depicting the Web Service layer that implements a Façade Pattern to hide the complexities of dealing with the business service layer.
Figure 28:
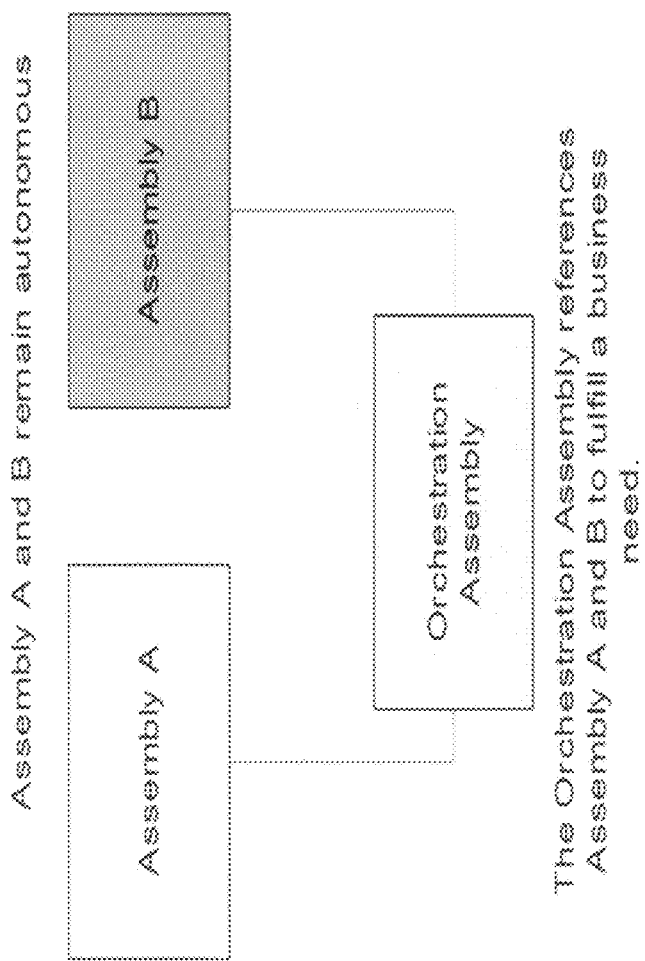
FIG. 28 is a graphic depicting how cross references between business layers are achieved through orchestration layers.
Figure 29:
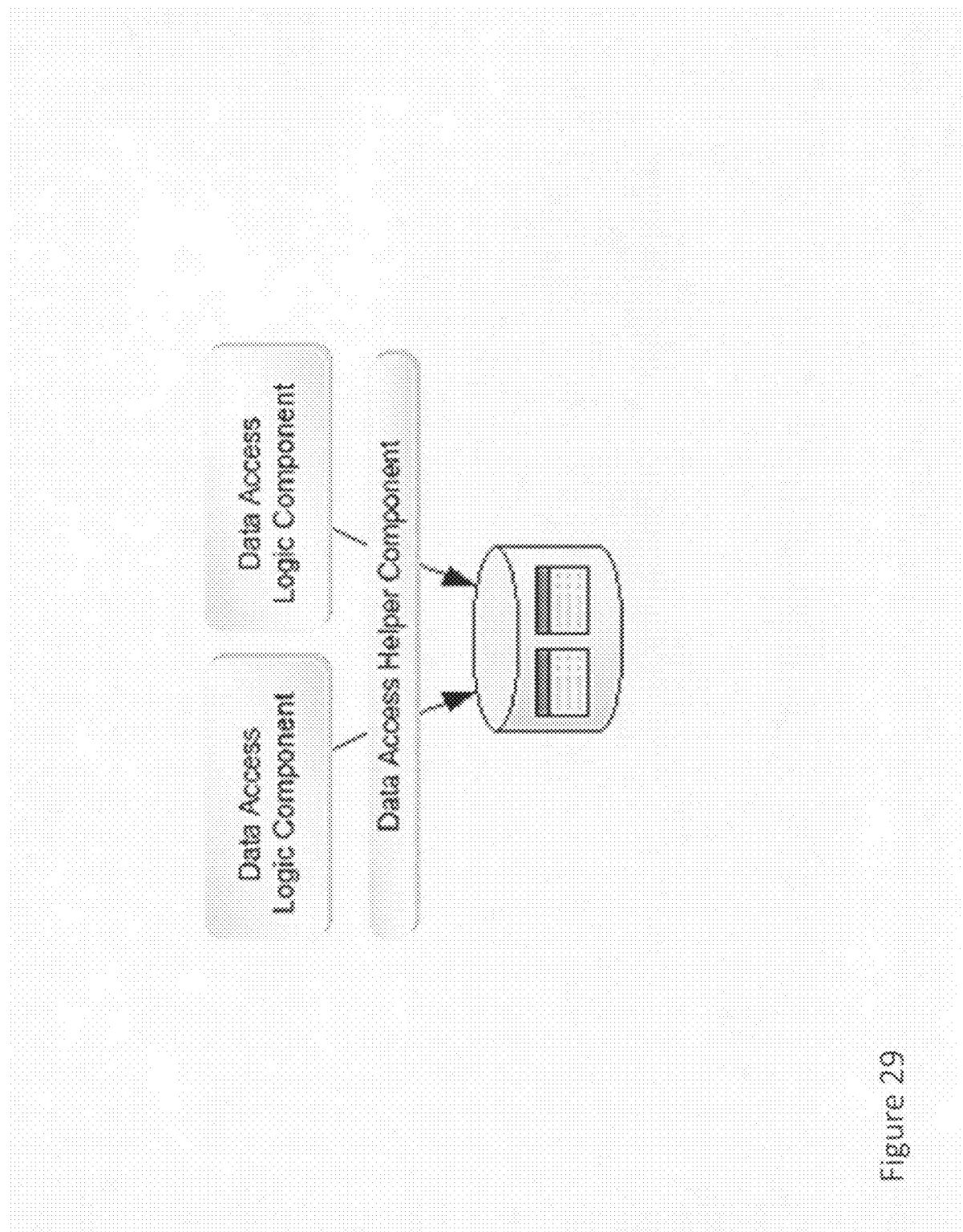
FIG. 29 is a graphic depicting the process of how data access components are implemented per data store.
Figure 30:
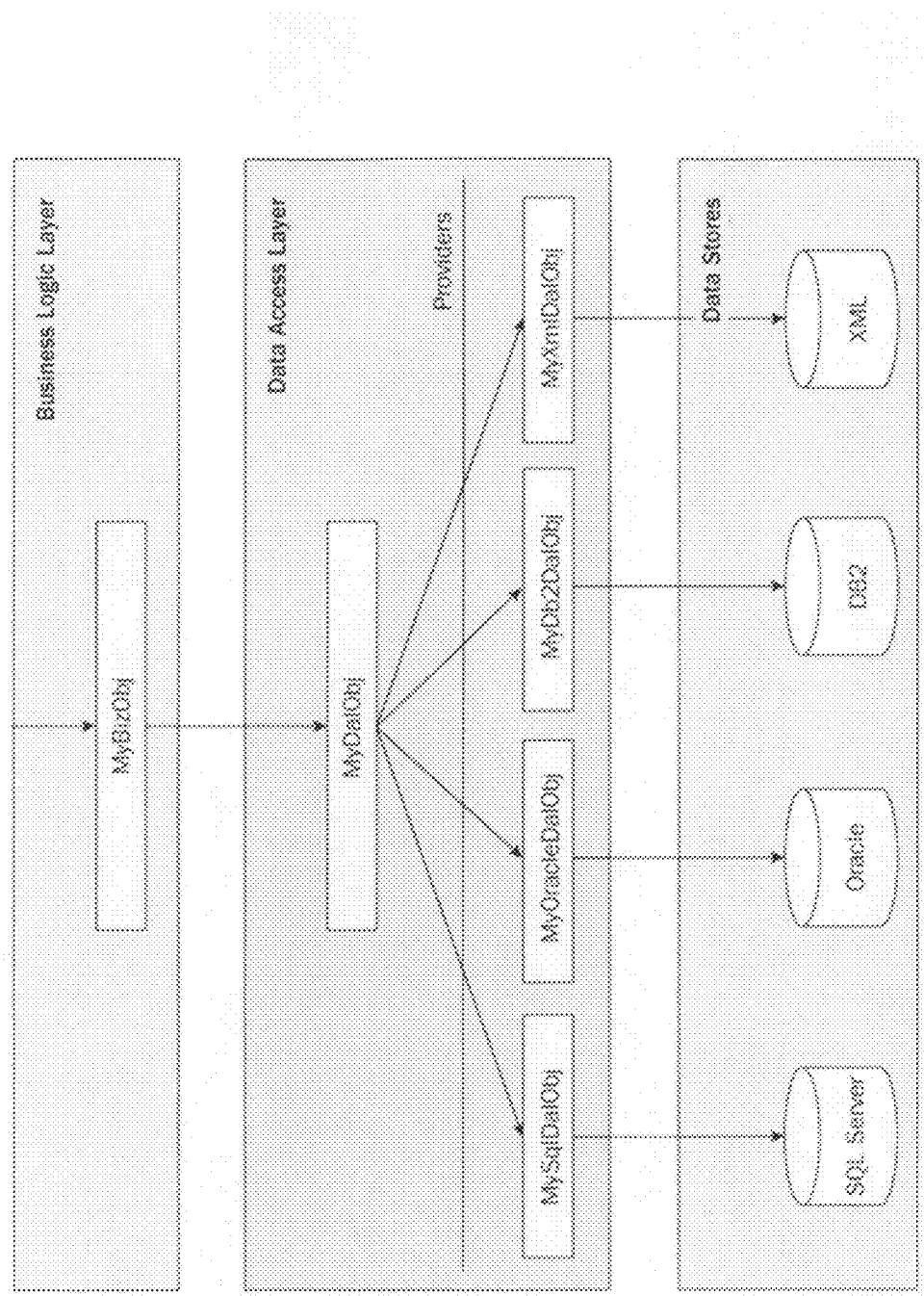
FIG. 30 is a graphic depicting the strategy of supporting. "programming to interfaces, not implementations" which essentially abstracts the business layer from the data access layer.
Figure 31:
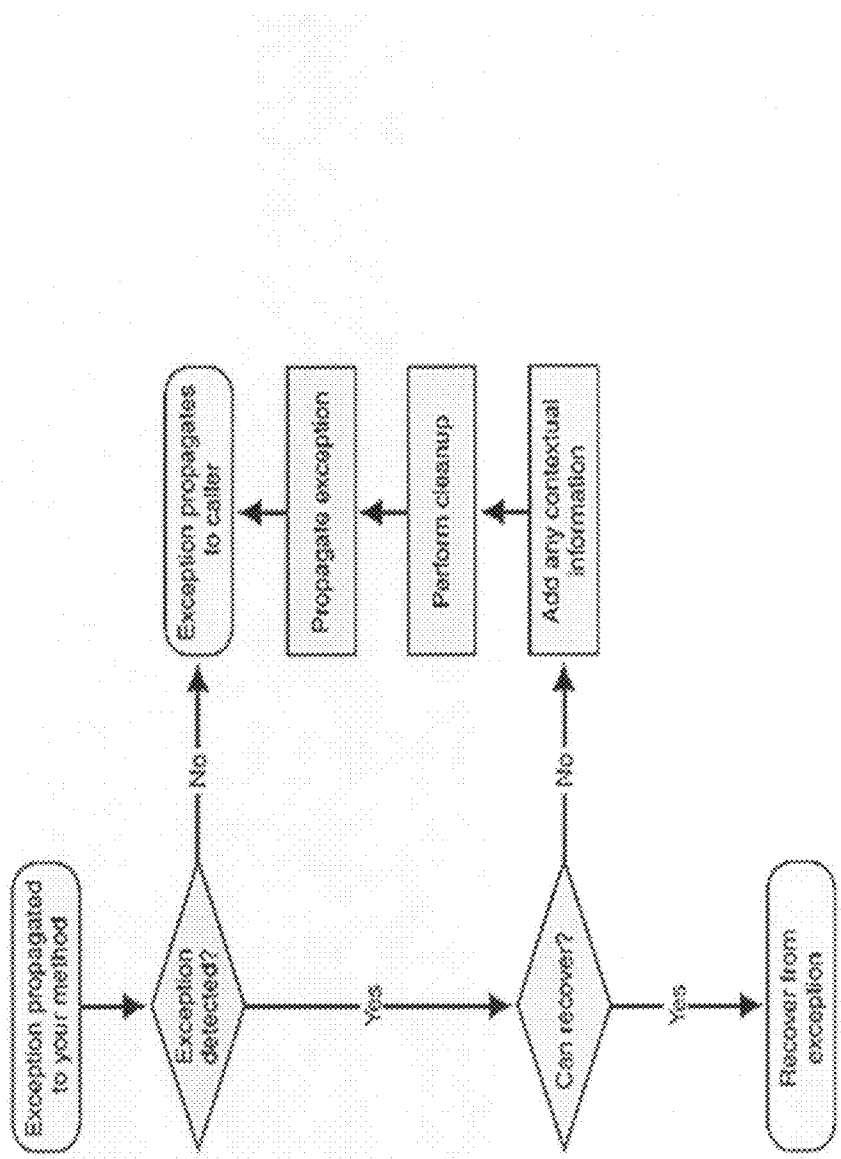
FIG. 31 is a graphic depicting the two main processes for handling exceptions.

What is claimed is:

1. A unique system and method using a computing device to implement a generic intelligent control room like function in any software system comprising of:
    (a) establishing all of the environmental parameters including organization structure awareness and the knowledge base and expert rules and questionnaires necessary to facilitate the following;
    (b) sending questionnaires electronically to selected individuals and/or roles being performed in the systems operations that measure operational systems health;
    (c) receiving, into the computing device, input from a system comprising data (hard data) concerning one or more key point indicators that are being measured;
    (d) receiving, into the computing device, input from a user comprising data (soft data) concerning one or more of the answers to the questions contained in questionnaires that are sent out by the system;
    (e) combining these two data inputs into a complete and rational picture for an end user of the system to make a logical and informed decision about action that needs to be taken;
    (f) the automatic sending of and where possible the direct execution of action to be taken upon the occurrence of a given set of circumstances which are predetermined by subject matter experts
    (g) the ability for these intelligent control rooms to be networked together into various configurations such as peer to peer relationships and hierarchical relationships creating a complex system of intelligent control rooms each with its own area of responsibility and communication ability.

2. The design of a database construct that allows the system and method of claim 1, to be extensible and have both entities and their associated attributes added to the system after it is deployed to a customer without the use of relational database management system data definition language or making any changes to the system's application program language code base.

* * * * *